UNITED STATES PATENT OFFICE.

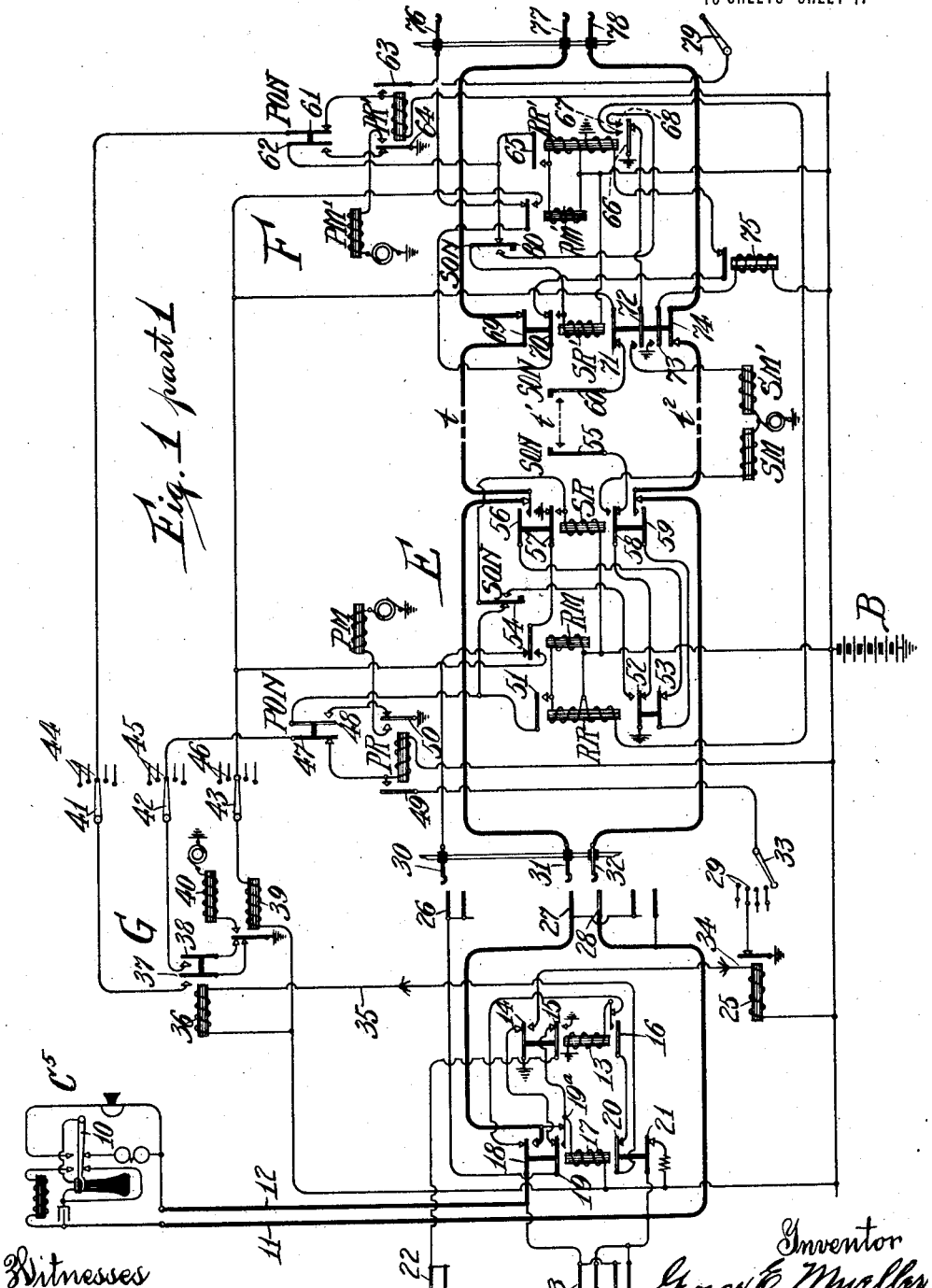

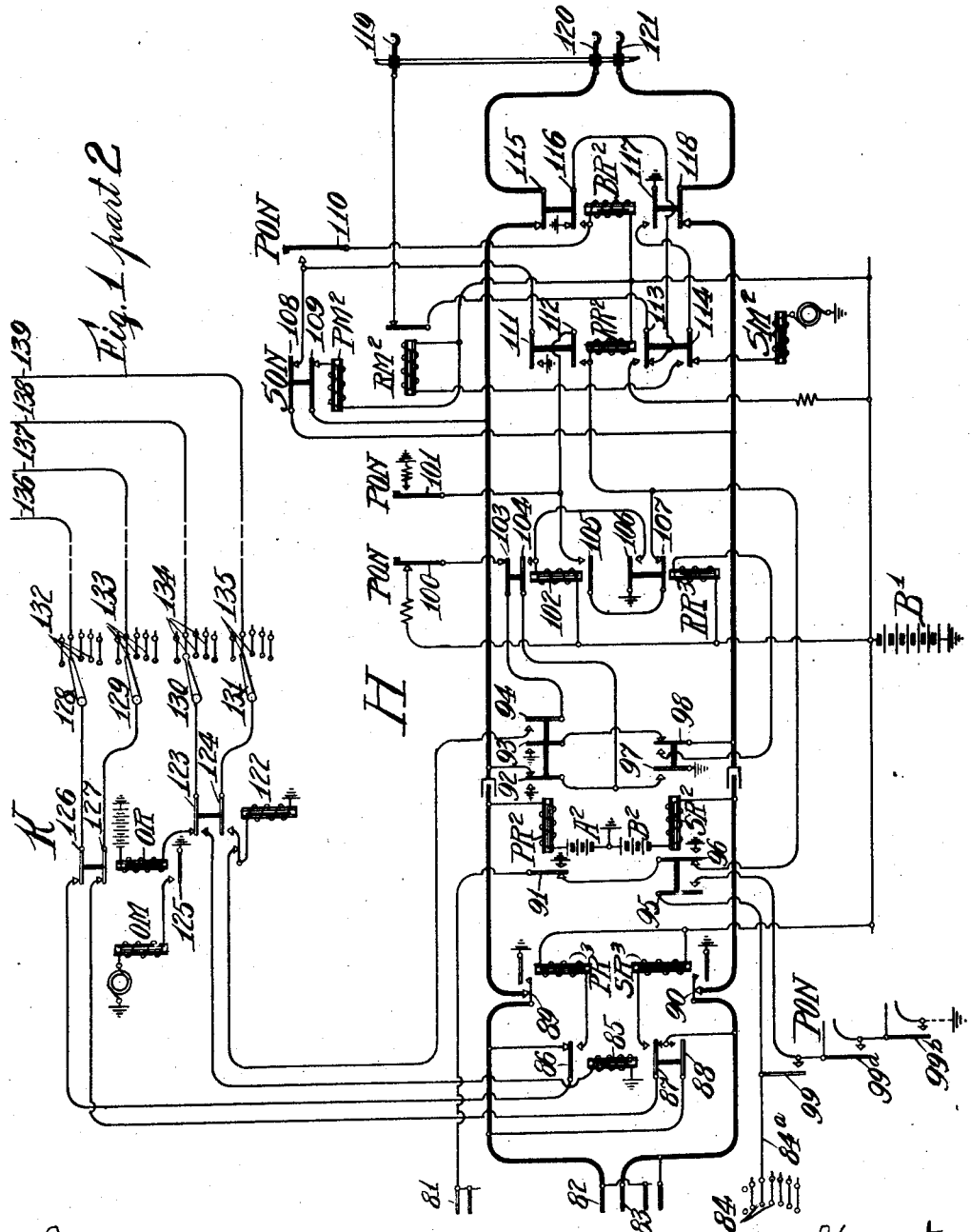

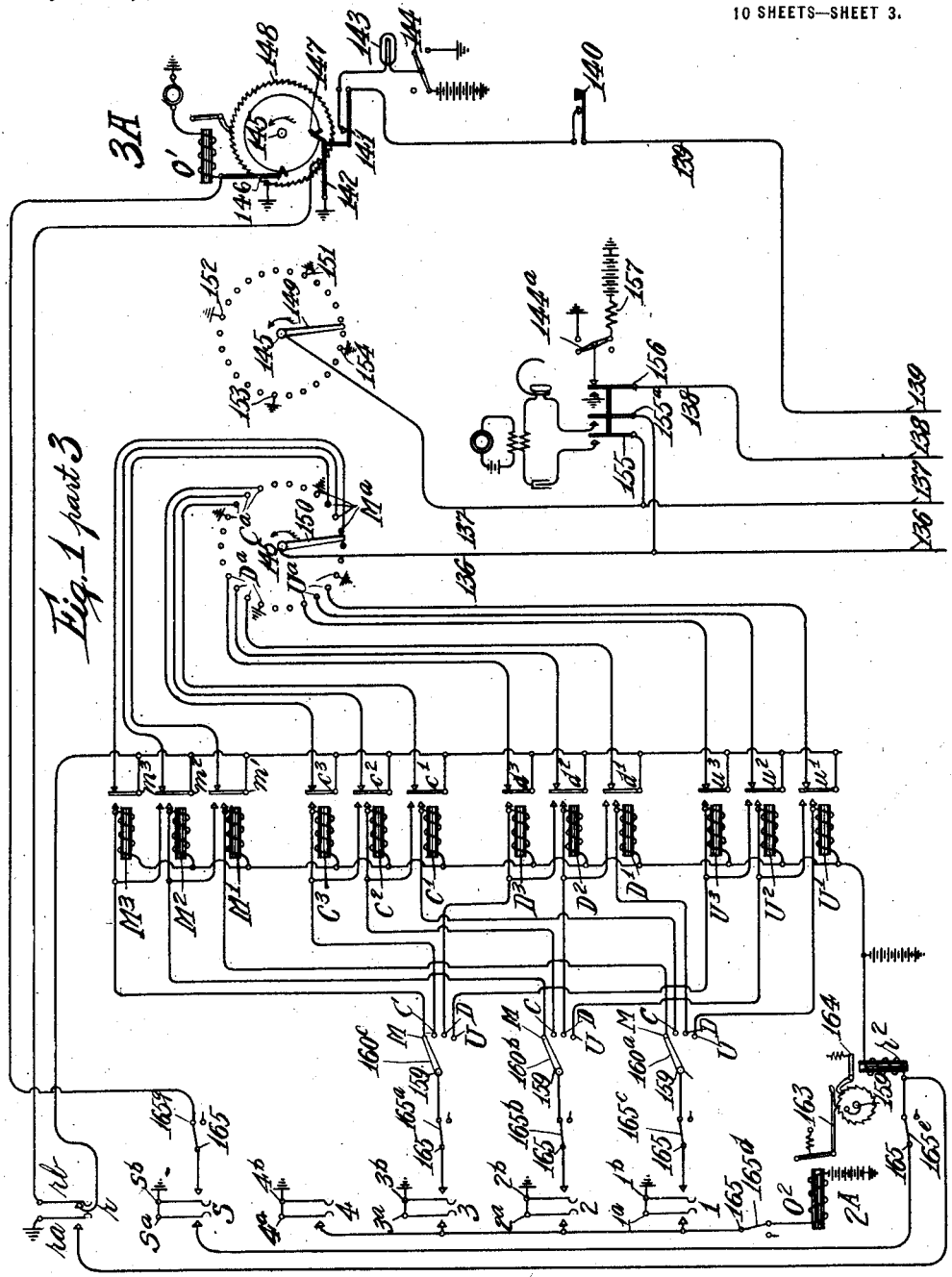

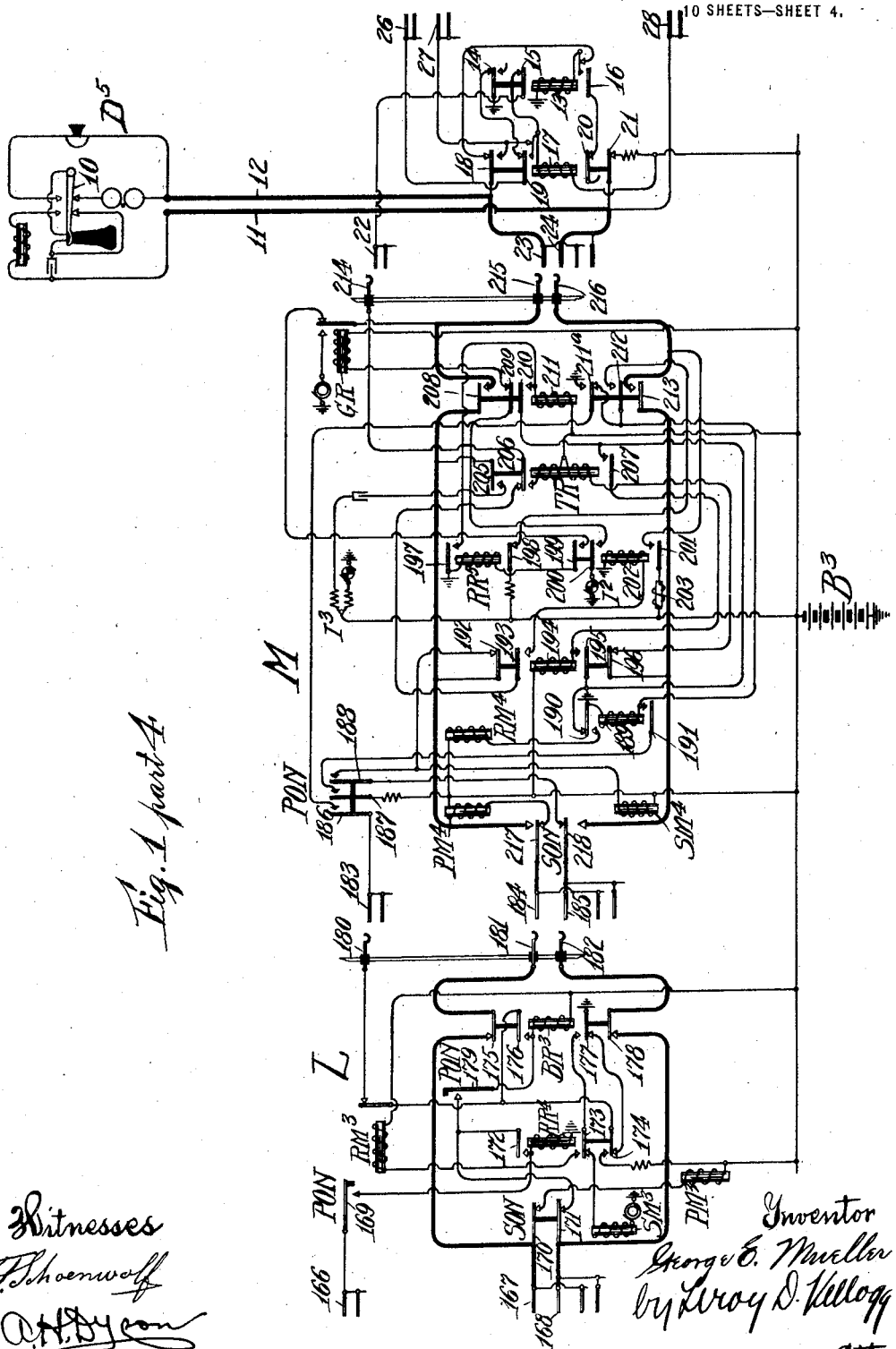

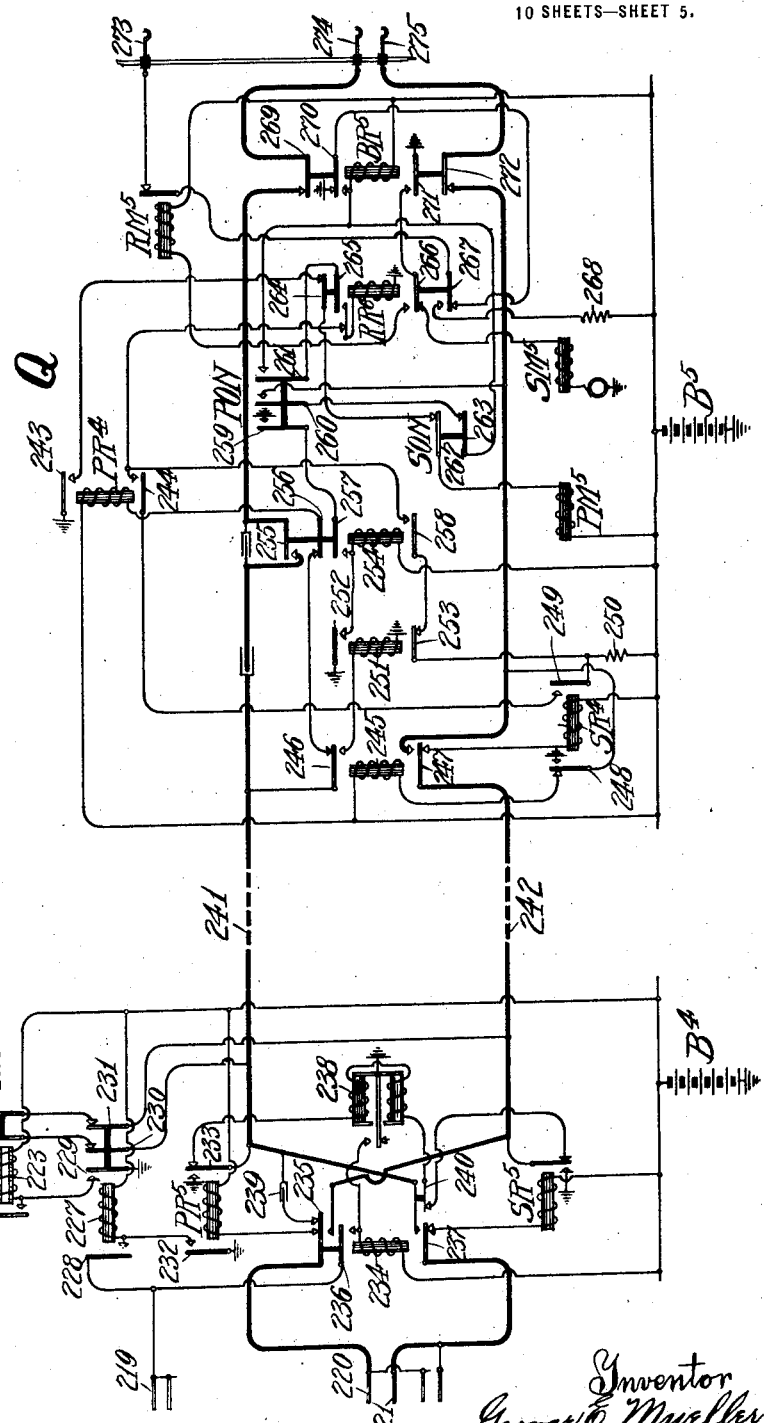

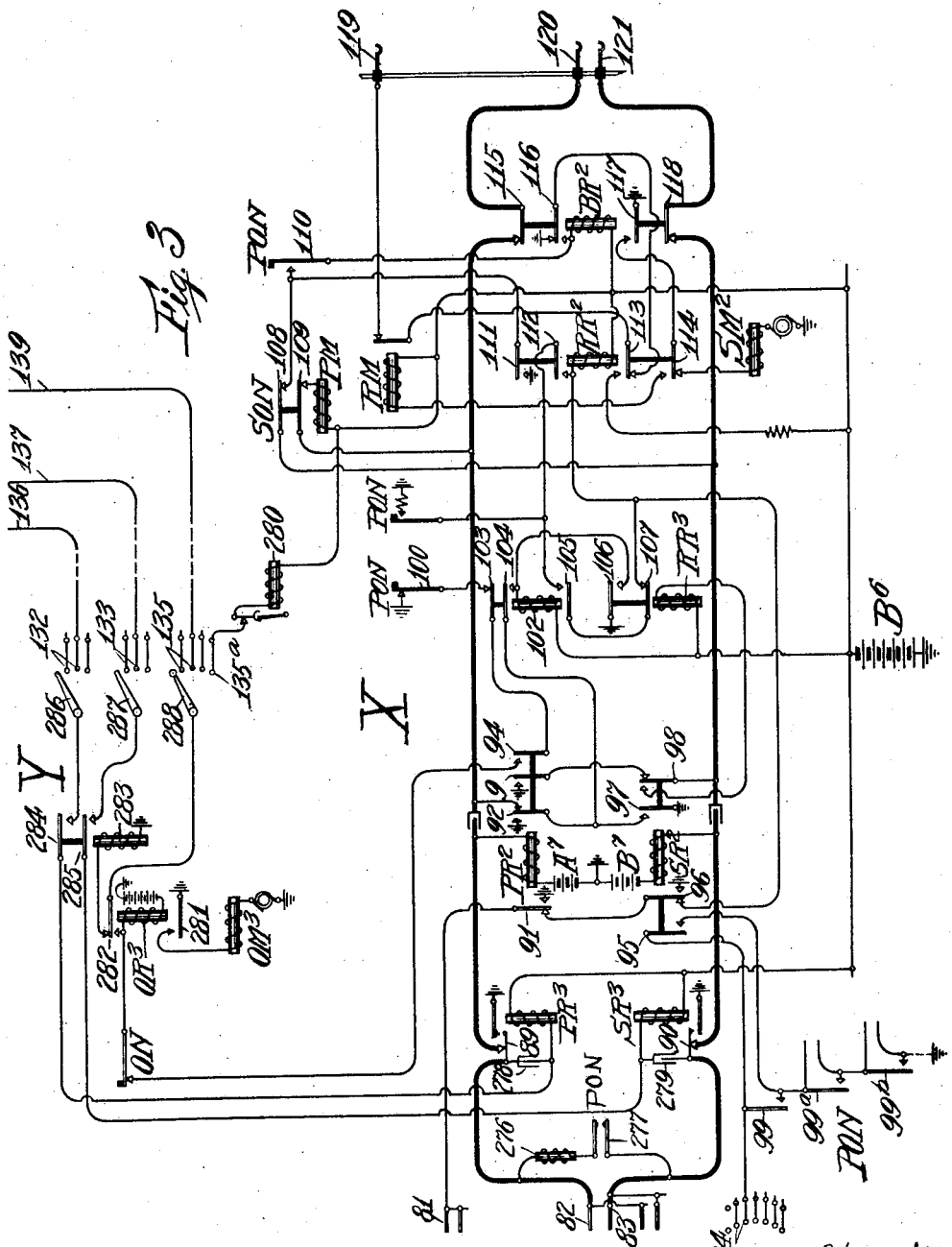

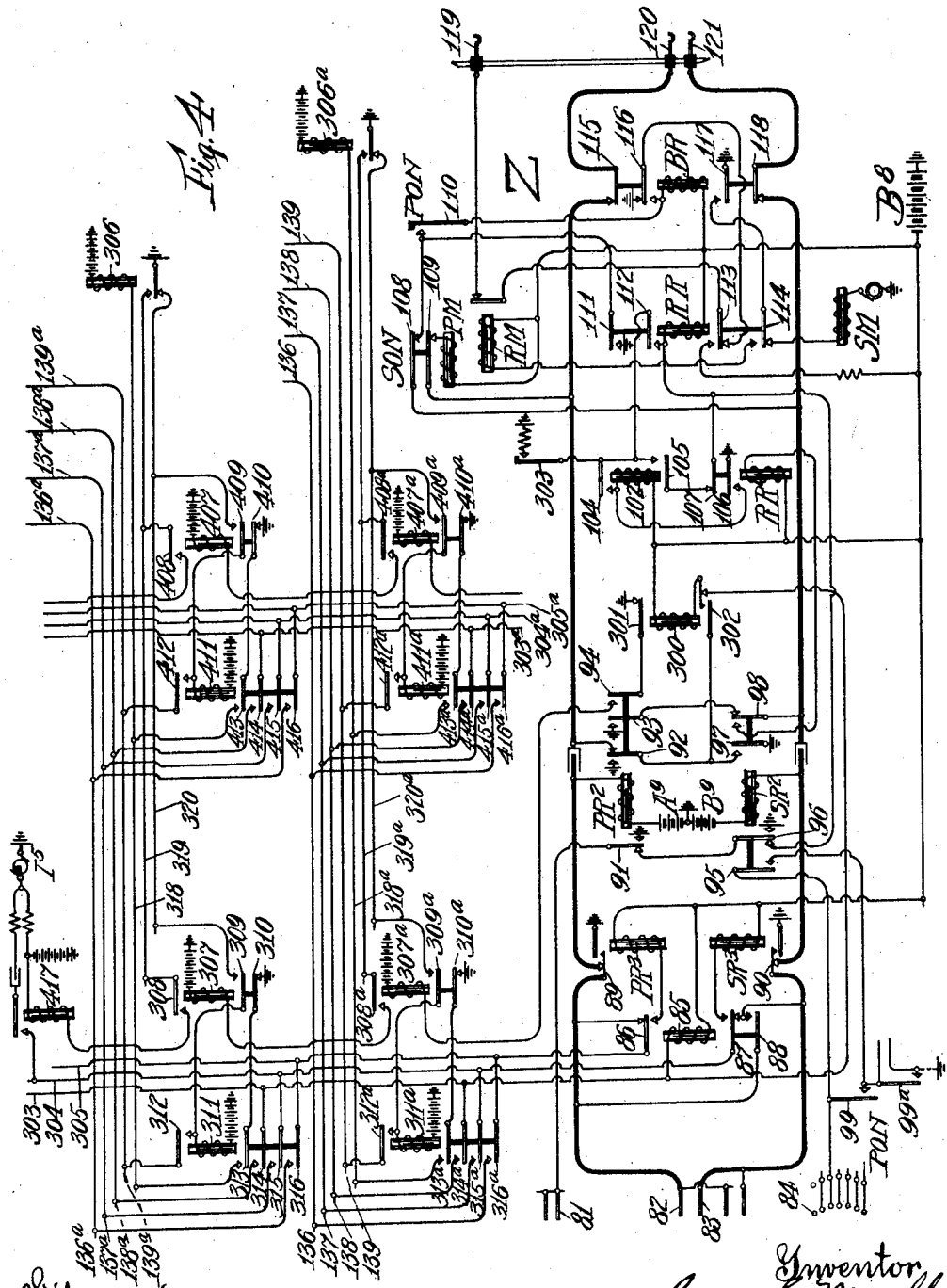

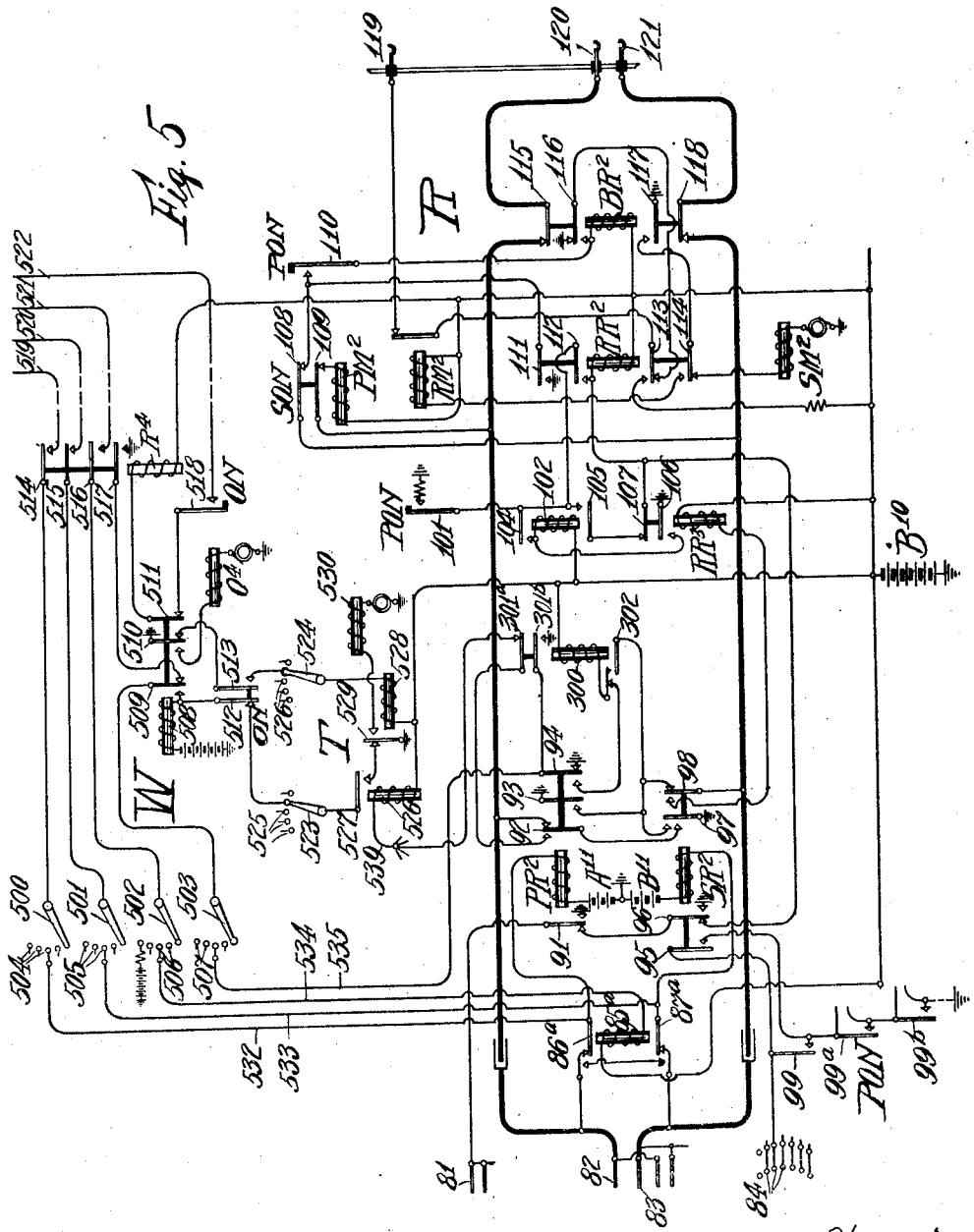

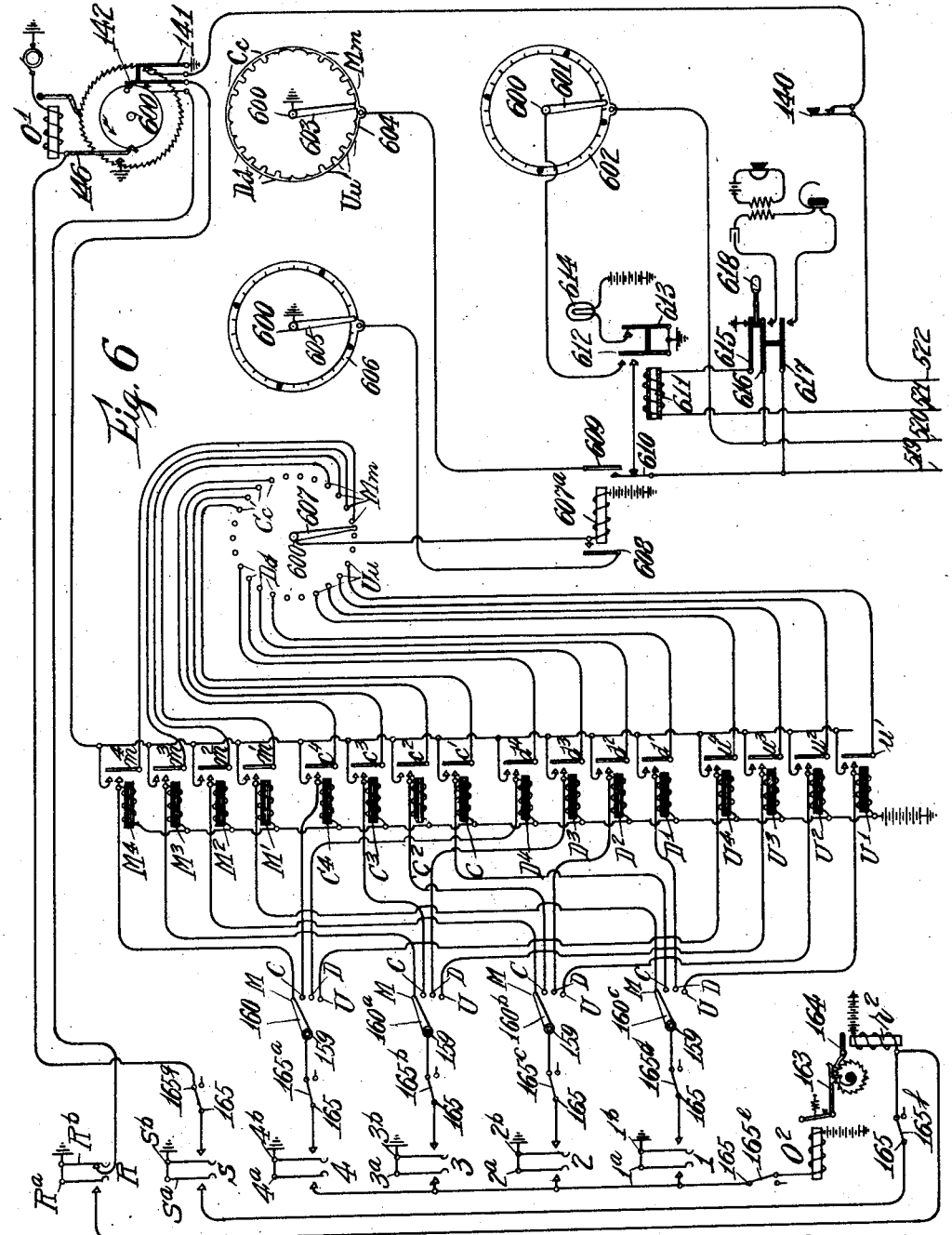

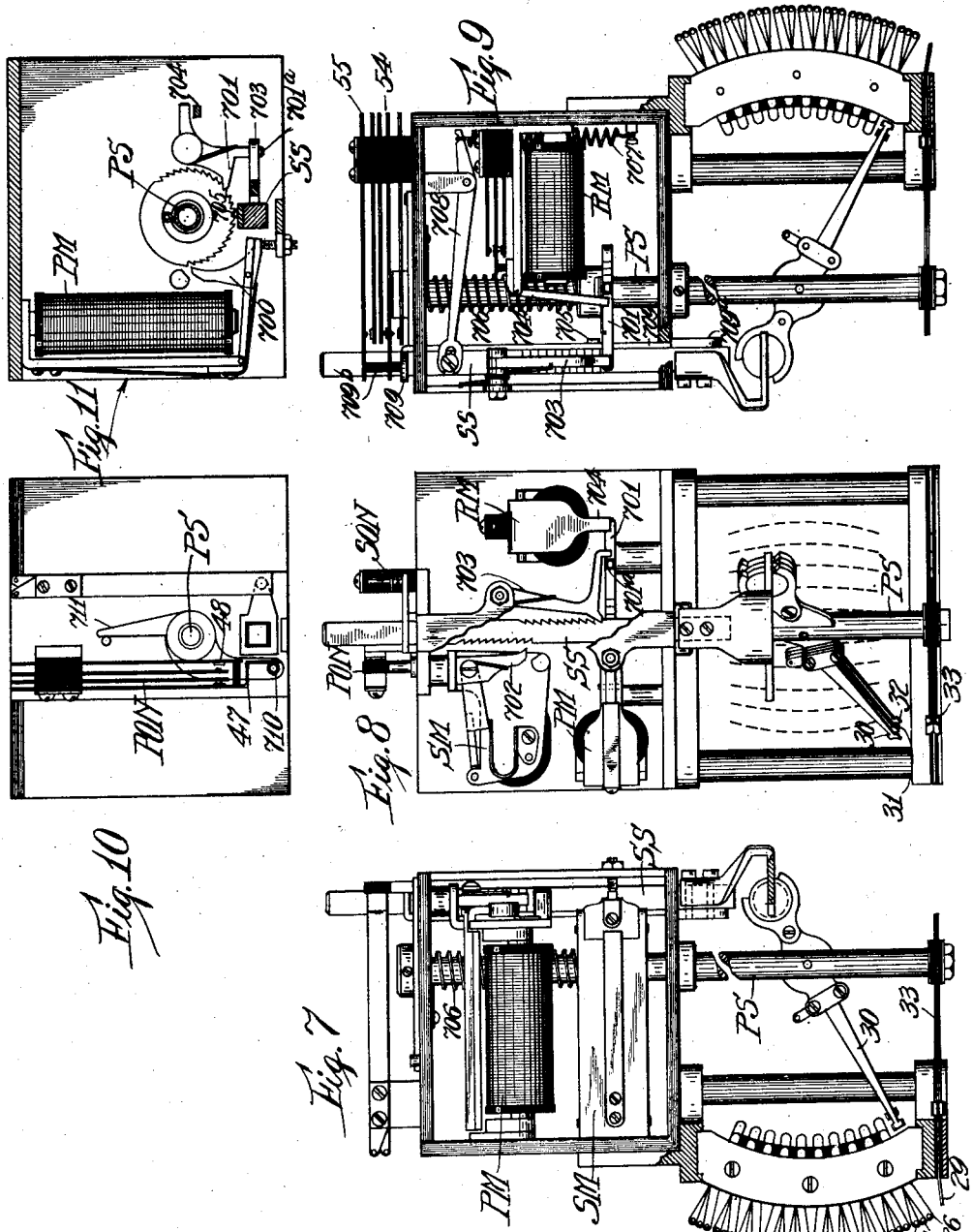

GEORGE E. MUELLER, OF AURORA, ILLINOIS, ASSIGNOR, BY MESNE ASSIGNMENTS, TO KELLOGG SWITCHBOARD & SUPPLY COMPANY, A CORPORATION OF ILLINOIS.

TELEPHONE-EXCHANGE SYSTEM.

1,391,136.  Specification of Letters Patent.  Patented Sept. 20, 1921.

Application filed June 20, 1908. Serial No. 439,582.

*To all whom it may concern:*

Be it known that I, GEORGE E. MUELLER, a citizen of the United States, residing in Aurora, in the county of Kane and State of Illinois, have invented new and useful Improvements in Telephone - Exchange Systems, of which the following is a specification.

My invention has to do with automatic and semi-automatic systems and I have elected to illustrate the same as embodied in the system of the latter class.

The invention is directed to a system wherein selective switches are employed to interconnect subscribers' telephone lines for conversation so organized that impulse transmitters at the subscribers' stations are unnecessary. To do this, I provide a number of operators' positions at the exchange, each having included in its apparatus, one or more impulse transmitting devices to be actuated by operators. I am aware that systems of this general character have heretofore been proposed and the present invention is directed toward certain improvements in such systems.

An object of the present invention is to provide means for automatically connecting the circuits at the exchanges over which connections are to be completed, with idle operators' calling devices, and then automatically disconnecting the circuits from such devices to render them available for further use as soon as the impulses have been transmitted. The connection of the exchange circuits with the calling devices may be automatically effected in a variety of ways, and I have illustrated two general ways in which this may be accomplished, one way requiring the use of selecting switches to effect the connections, and the other accomplishing the result by means of relays.

Another object of the invention is to provide, in combination with the before indicated system, an improved operator's transmitting device. In the organized system of my invention, a plurality of impulse sets must be transmitted to complete each connection, for instance, one set representing the thousands, another set the hundreds, and other sets the tens and units. Assuming a maximum of ten impulses per set, ten buttons will be provided preferably numbered according to the number of impulses they are adapted to transmit. Different buttons may serve to transmit the four sets of impulses required for a connection according to the digits of the number to be transmitted, or in case each set of impulses should be of the same digit value, as for example 3333, the "3" button will be depressed by the operator four times. The buttons employed may operate in the manner of the customary order wire buttons, being actuated by an operator and immediately restored when released. Thus, a simple impulse transmitting device is provided and one capable of rapid operation. Other objects of the invention will be referred to in the detailed description, and the scope of the invention will be strictly pointed out in the claims.

Referring to the drawings, I have illustrated in Figure 1, consisting of the parts 1 to 4 inclusive, circuits of a semi-automatic telephone system arranged in accordance with my invention. Fig. 2 illustrates a circuit adapted for employment when trunking between exchanges is employed. Fig. 3 illustrates a modified first selector circuit and its auxiliary mechanism. Figs. 4 and 5 illustrate other modifications of first selector circuits. Fig. 6 illustrates a modified operator's impulse transmitter arrangement. Figs. 7, 8 and 9 are elevations of a selective switch which may be employed in connection with the circuits of my invention. Fig. 10 shows detail of the primary off-normal switch of said selective switch. Fig. 11 is a sectional view showing in detail the arrangement of a primary magnet, with its associated mechanism, of said selective switch.

Referring first to Fig. 1, Parts 1, 2 and 4, are to be placed in the order indicated with Part 1 at the left, Part 3 being placed immediately above Part 2 to constitute a complete circuit diagram illustrating a preferred embodiment of the invention.

The sheets being arranged in the way indicated, it will be observed that at $C^5$ and $D^5$, I have indicated two substation telephone circuits of well known character whereof $C^5$ in the present description will be the calling substation and $D^5$ the called substation. The instrumentalities employed in completing a connection between the calling station C⁵ and the called station D⁵ will include a line selector E which starts its travel upon the initiation of a call at substation C⁵ and automatically picks out the calling line. Simultaneously with the starting of the switch E, another automatic switch F paired with the switch E starts into operation and automatically selects an idle first selector H. Thereupon, the switch K associated with the first selector H, has its circuit connections changed so that a signal pertaining to an operator's impulse transmitter will be displayed at the operator's position, the circuits of one transmitter being shown in Fig. 1, Part 3. It may be stated at this time that the switches K, one of which is provided for each first selector H, have before their wiper contacts 128, 129, 130, 131, multiple contacts 132, 133, 134, 135, each set of multiple contacts being connected to a different impulse transmitter and the signal associated with it. When the first selector H is idle, the wipers of its associated switch K will rest engaging the multiple contacts of an idle transmitting device. Should the multiple contacts of such transmitting device be made busy, the wipers of the switch K will be automatically moved free from the contacts of the then busy device and will seek out contacts of an idle device.

When the calling line has thus been extended to an impulse transmitting device, the call signal associated therewith will be displayed and the operator observing the signal, ascertains the want of the calling subscriber, and actuates the buttons of the calling device to count out the called subscriber's number; whereafter the impulse transmitter automatically transmits the proper impulses to adjust directively operable switches to connect with the called-for line. In the present instance, a ten thousand line system is illustrated, in which case first selectors H are employed to select the thousands, second selectors L to select the hundreds, and the connectors M to select the tens and units. Each first selector H has before its wipers 119, 120, 121, a plurality of groups of multiple contacts 166, 167, 168, each group forming terminals of second selectors L assigned for connections to a different thousand. Further, each second selector L has before its wipers 180, 181, 182, a plurality of groups of multiple contact sets, 183, 184, 185, the sets of each group forming terminals of connectors M assigned for connection to a different hundred of the thousand which the second selector L serves. Further, each connector M has before its wipers 214, 215, 216, a plurality of groups of multiple contact sets 22, 23, 24, the said contact sets forming multiple called terminals of subscribers' lines. There are preferably ten groups of contact sets, each group including ten sets, the groups being arranged before the wipers of the connectors M according to their tens values.

In the system of my invention, the subscribers' lines may all terminate in a single exchange or they may be divided so as to terminate among a number of different exchanges. Preferably, however, in any case, all the operators' positions are to be placed in a single locality, as this will materially decrease the expenses of operation as compared with a system in which it is necessary to provide operators' quarters in a number of places.

Assuming now a system having eight thousand subscribers' lines, divided among four different exchanges, there being thus two thousand lines in each exchange, and assuming further that all operators' transmitting devices are to be placed in one of these exchanges, a preferred arrangement is as follows: The subscribers' lines of each exchange will have assigned to them, as calling lines, a suitable number of first selectors H together with a suitable number of pairs of switches E and F to interconnect the said calling lines with the first selectors. The first selectors H would have before their wipers 119, 120, 121, not only terminals of groups of second selectors for connections with the two thousand lines terminating in that exchange, but would also have before said wipers, groups of terminals of trunk lines extending to second selectors in each of the three other exchanges. In this way each first selector H may be operated to pick out local trunk lines for connection within the exchange, or to pick out long trunk lines extending to any desired one of the other exchanges.

As before indicated, each first selector H of the exchange now under consideration, has its associated individual switch K connected with the wires 136, 137, 138, 139; these wires, assuming that the operator's exchange is not the one now under consideration, are long conductors extending from the exchange now under consideration to the operator's exchange. For each connection to be completed, a trunk line consisting of wires 136, 137, 138, 139, will be used for a short space of time only, namely, long enough for the operator to ascertain the number of the called-for subscriber and for the calling device to automatically count out the digits of the called number whereupon, as before indicated, the calling device and the trunk line including the wires 136, 137, 138, 139, are instantly freed. Thus, while each trunk to the operator's position as illustrated, requires four conductors (although the invention is not limited to the particular arrangement shown), a very small number of such trunk circuits will suffice to handle a large number of calls on account of the short use required for each call.

Referring now to the exchanges of two thousand lines each, the two thousand lines of the exchange, at which the line of calling subscriber C⁵ terminates, are preferably divided as calling and called lines into twenty groups of one hundred lines each. Each group of one hundred lines would, on the usual ten per cent. basis, have ten connectors M assigned for making connections therewith. As calling lines, each one hundred line group would have ten line selectors E common to the group and of course an equal number of paired automatic switches F. The first selectors H of which there would be preferably two hundred, would be divided into two groups of one hundred each and their multiple contacts 81, 82, 83, would appear before the wipers 76, 77, 78, of one hundred switches F so that each one hundred of first selectors H would be common to one thousand calling lines.

For each one hundred lines as calling lines, the master-switch mechanism G is provided which serves whenever one of the lines initiates a call to start the switch of an idle pair EF whereof the switch E will select the calling line and the switch F will select the idle first selector H.

Assuming that the calling subscriber C⁵ desires his line to be connected for conversation with that of the called subscriber D⁵, whose line will for the present be assumed to terminate in the same exchange as that of C⁵ and whose number is 1233, the calling subscriber C⁵ removes his receiver from its hook whereupon hook lever 10 rises in the customary manner and closes a conductive bridge at the substation. Circuit may thereupon be traced from ground through the line relay 13, normal contact 18, line limb 12, raised hook-lever 10, returning over line limb 11, contact 21, to battery B. The multiple contact sets 26, 27, 28, of the subscribers' lines at the line selectors E are normally unselectable owing to the private contacts 26 being grounded through normal contacts 19 and 14. On the operation of relay 13, armature 14 is attracted, removing ground from the private contacts 26 of the calling line C⁵ at the line selectors, thus rendering them selectable, and said armature 14, by engaging its front contact, operates a sub-group relay 25 over the common conductor 34 whereby the relay 25 attracts its armature and ungrounds the multiple group contacts 29 of the sub-group at the line selectors. The relay 13, by armature 15, places ground upon the multiple private called contacts 22 of the calling line rendering them busy against incoming calls. Armature 16 of relay 13 disconnects the relay from the calling line and locks the same in series with the master-switch relay 36 over the common conductor 35 which has one hundred branches, one to each line relay of the one hundred lines which the master-switch serves.

The line selectors E are preferably double-acting switches of the type illustrated in Figs. 7 to 11 having before their wipers 30, 31, 32, one hundred sets of multiple calling contacts 26, 27, 28, arranged in ten groups of ten contact sets each. It is therefore necessary, when the line selector E is started in its travel, to first select the sub-group in which the calling line is located and thereafter select the calling line out of the previously selected group. For the purpose of controlling the line selector's travel in selecting the group, each sub-group of ten lines has a group relay 25 controlling the multiple group contacts 29 for that sub-group. To engage with the contacts 29, a group selecting wiper 33 is provided which controls the travel of the started line selector E in selecting the group, said wiper 33 moving with the wipers 30, 31, 32, on their primary travel. When the wiper 33 engages an ungrounded contact 29, the primary travel of the line selector E ceases and wipers 30, 31, 32, have then selected the sub-group in which the calling line has its contacts. Thereafter the said wipers 30, 31, 32, begin traveling in an intersecting plane, while the wiper 33 remains motionless, to pick out the calling line.

Before proceeding with a further description of the circuits, I will briefly refer to the mechanical drawings of Figs. 7 to 11 which illustrate more specifically a line selector, although the same mechanism is adapted for the switches F and also for the first and second selectors and the connectors used in the system.

In the side elevation of Fig. 7, one group of ten contact sets is illustrated, each set consisting of three contacts 26, 27, 28. In Fig. 8, showing the front view of a contact bank, each set is represented by a single short line, this view, therefore, disclosing ten groups of ten contact sets each. As indicated, the contact sets are arranged as if projecting through the inner surface of a section of a sphere. The wipers 30, 31, 32, are first adjusted in a rotary direction from left to right a series of steps, each step bringing them beneath a different group of contact sets. When a proper group has thus been selected, the ends of the wipers 30, 31, 32, are rotated step-by-step upward over the contact sets of the selected group. For rotating the wipers to select the group, a primary shaft PS is provided at whose lower extremity the group wiper 33 is mounted, the group contacts 29 being inserted in the base of the switch bank, one contact 29 being provided for each vertically extending group of contact sets. The wipers 30, 31, 32, are pivoted in the primary shaft PS and have a rearwardly extending part which engages a broad piece mounted upon the secondary shaft SS. The primary motion of the wipers to select the group is accomplished by rotating the primary shaft PS, while the secondary travel of the wipers is accomplished by moving the secondary shaft SS down, whereby the switch wipers are rotated in their pivoted bearing in the shaft PS.

For driving the primary shaft PS, a primary magnet PM and an actuating pawl 700 (see section Fig. 11) is provided, the said pawl being arranged to engage successive teeth of the ratchet shown attached to primary shaft PS. A retaining pawl 701 engages teeth of said ratchet and holds the same against back movement under the influence of the spiral spring 706. Successive actuations of magnet PM prevail to move the ratchet, shaft and wipers step-by-step from left to right. The piece upon the secondary shaft SS engaging the rearwardly extending portion of wipers 30, 31, 32, is sufficiently broad so that it remains in engagement with said part of the wipers in whatever position they may be adjusted laterally.

After the primary adjustment of shaft PS, the secondary magnet SM is actuated a number of times, each actuation producing a stroke of pawl 702 which engages successive teeth in its associated ratchet on shaft SS, said shaft being thus moved step-by-step downwardly, the retaining pawl 703 holding the same against back movement which would otherwise occur under the influence of spring 707 acting upon the pivoted arm 708 which loosely engages a screw threaded to shaft SS, as indicated in Fig. 9. Each step of shaft SS will obviously move the contact ends of wipers 30, 31, 32, a step upwardly and with each step they engage a different contact set of the previously selected group.

After the wipers have been adjusted and are to be restored to normal, the release magnet RM is actuated. Its attracted armature 704 then engages an end of the pivoted retaining pawl 701 of the primary ratchet. This withdraws the pawl from the primary ratchet. Simultaneously therewith the pawl 703 is, by an arm 701ª upon the pawl 701, withdrawn from engagement with the retaining ratchet of shaft SS. Spring 707 then avails to raise the shaft SS upward whereby the wipers of the switch are restored as to their secondary travel. Until this occurs, the tension of spring 706 upon primary shaft PS is unavailing, because of the fact that tooth 705 of the piece 709 is engaging one of the teeth of the ratchet wheel of primary shaft PS. It will be noted that the extension 709ª of shaft SS when at normal, as shown in Fig. 9, engages the lower extremity of the piece 709, holding the piece and tooth 705 in a raised position. On the first downward step of shaft SS, the piece 709 is freed and is moved downward by springs 54, 55, so that tooth 705 engages whatever tooth of the primary ratchet it is then opposite. When the secondary shaft in the restoring process reaches normal, it again raises the piece 709, tooth 705 disengages the primary ratchet and the tension of spring 706 is then effective to move shaft PS and the switch wipers back to normal. In addition to parts heretofore mentioned, each selective switch includes a primary off-normal switch and secondary off-normal switch. As indicated in Fig. 10, the primary off-normal switch (which is indicated throughout the drawings by the letters PON), may include the springs 47 and 48, the former having an angular bent portion for engagement by the stud 710 mounted upon an arm 711 fastened to shaft PS. Obviously, on the first primary step, arm 711 will be rotated a step, stud 710 will free spring 47, whereupon the two primary off-normal springs, by their tension, will assume their alternate positions. The secondary off-normal switch, best shown in Fig. 9, may include the actuating springs 54 and 55 provided with a stud 709ᵇ normally engaged by the piece 709, whereby the springs 54, 55, are held in a definite normal position. On the first downward step of shaft SS, as before indicated, the piece 709 frees the secondary off-normal springs 54, 55, and they then move, by their tension, to engage their alternate contacts.

The mechanical structure shown in Figs. 7 to 11 inclusive, may be used without change for those portions of Fig. 1 indicated by E and F. For the first and second selectors and connectors, a similar switch structure may be employed, it being understood that the primary off-normal and secondary off-normal switch combinations indicated in the circuit drawings will be provided for the respective switches. Of course when the mechanical structure is employed for a directively operable switch, the group wiper 33 and the group contacts 29 are not required.

Returning now to the description of the circuits shown in Fig. 1, Part 1, as soon as relay 13 operated, as before described, locking itself in series with the master-switch relay 36, the energization of the latter closed the contacts 37, 38. The wipers 41, 42, 43, normally rest engaging contacts 44, 45, 46, of an idle switch pair EF, as hereafter explained, and circuit may now be traced from ground at the armature of relay 39 through contact 38, contact 42, 45, normal contact 47 and primary relay PR of switch E to battery B, energizing relay PR whose attracted armature 49 connects the relay's winding with the group wiper 33. Armature 50 of the relay PR closes a generator circuit for primary magnet PM and primary steps of the line selector E are now produced by said magnet, moving the wipers on their primary travel until wiper 33 engages an undergrounded subgroup contact 29, because the relay PR will continue energized by current over locking armature 49 through wiper 33 and to ground through normal, i. e. grounded, contacts 29 until the sub-group contact of the group in which the calling line is included is reached; at this time the attracted armature of the group relay 25 allows relay PR to be deënergized and its armature retracted, armature 50 then opening the circuit of magnet PM and preventing further primary steps of the switch. On the first primary step of switch E, the primary off-normal PON contacts 47, 48, were shifted, the shifting of contact 47 opening the initial energizing circuit of relay PR which thereafter remains dependent upon wiper 33 for its continued energization. Circuit may now be traced from ground through normal switch contact 50 of relay PR, through closed contact 48, normal contact 54, secondary relay SR to battery, energizing said relay SR which, by armature 57, connects its winding with the circuit extending to the private wiper 30. Armature 58, engaging its alternate contact, completes a generator circuit for secondary magnet SM traced through normal contact 52, so that magnet SM receives actuating impulses, stepping the wipers 30, 31, 32, up over the contact sets 26, 27, 28, of the selected sub-group seeking a contact set whose private contact 26 is undergrounded. Relay SR will continue energized until wiper 30 engages an ungrounded contact 26 because of the successive locking circuits established by wiper 30 in engaging successive contacts 26 of lines not calling, said circuits being traceable through normal contacts 19 and 14. As soon, however, as wiper 30 engages the contact 26 of the calling line $C^5$, the ungrounded condition of such contact causes the deënergization of relay SR and further actuations of secondary magnet SM will be prevented. The secondary off-normal contacts 54 and 55 were shifted on the first secondary step of the switch wipers so that thereafter, relay SR depended upon the circuit through wiper 30 for its continued energization. The calling line has thus been selected by the line selector E.

The trunk selector F was started simultaneously with line selector E by current from ground through the armature of relay 39 at G, attracted armature 37, contact 41—44, primary off-normal contact 61 of switch F and its primary relay PR', which then attracted its armature 64 to close a circuit through primary magnet PM' which receives actuations to cause primary travel of the switch F. Armature 63 of the relay PR' connects the relay's winding with the group wiper 79, and relay PR' will continue energized and magnet PM' continues to receive actuations until the wiper 79 engages an ungrounded group contact 84 pertaining to a group of first selectors H having one or more unemployed ones among it. The group contacts 84 of groups of first selectors H in which there is no idle switch are grounded as hereafter explained. Thus, as soon as the wiper 79 engages an ungrounded contact 84, relay PR' is deënergized, its armature retracted and further actuations of primary magnet PM' prevented. The primary off-normal contacts 61 and 62 of switch F were shifted on the first primary step, contact 61 opening the initial energizing circuit of relay PR' which thereafter depended for its continued energization solely upon the wiper 79. On the deënergization of relay PR', circuit is traced from ground through normal contact 64, the shifted contact 62, normal contacts 80, and secondary relay SR' to battery. Said relay SR' energizes and by armature 72, closes a generator circuit for the secondary magnet SM' traceable through normal contact 66. Armature 70 of relay SR' connects the relay's winding with the private wiper 76 and the relay SR' will continue energized during the secondary travel of switch F until wiper 76 engages an ungrounded contact 81, which will be one pertaining to an idle first selector H; contact 81 of busy first selectors being characterized by ground connections as hereafter explained. When wiper 76 engages the ungrounded contact 81, relay SR' will be deënergized, its armatures retracted and further actuations of secondary magnet SM' prevented, whereby wipers 76, 77, 78, rest engaging multiple contacts 81, 82, 83, of the idle first selector H. The secondary off-normal contacts 60 and 80 of switch F were shifted on the first secondary step, the shifting of contact 80 opening the initial energizing circuit of relay SR' and rendering it dependent for current upon the wiper 76.

Immediately following the selection of contacts 81, 82, 83, of first selector H, the relays $PR^2$ and $SR^2$ will be energized whether or not the line selector E has completed its selection. If said line selector E has not completed its selection, relay SR will be energized and circuit will then be traceable from the positive pole of battery $A^2$, relay $PR^2$, normal contact 89, contact 82—77, normal contact 69, wire $t$, alternate contact 56, normal contact 53, alternate contact 59, normal contact 74, contact 78—83, normal contact 90, relay SR² to battery B². When, under the circumstances just described, switch E completes its selection, the deënergization of relay SR will close a substitute circuit for relay PR² extending through normal contact 56, contact 31—27, normal contact 19ª, cut-off relay 17 to battery, which relay by attracting its armature 18, continues the circuit of relay PR² over the calling line, a return circuit being traceable over limb 11, contact 28—32, normal contact at 59, and through relay SR² to the negative side of battery B². These circuit changes occur without allowing the deënergizations of relays PR² and SR². On the actuation of relay 17, its armature 19 locks said relay via contact 26—30, armature of magnet RM and normal contact 57 to ground. The armature 20 of relay 17 opens the locking circuit including relays 13 and 36 and they are immediately deënergized, the deënergizations of relay 13 deënergizing the group relay 25 whereby the ground is restored to the group private contacts 29. It will be noted that as soon as switch E completed its selection, retracted armature 57 places ground via wiper 30 upon the multiple contact 26 so that the contacts 26, 27, 28, of the calling line were rendered unselectable with respect to other line selectors. If the line selector E had completed its selection before the trunk selector F, circuit changes similar to those just described would have occurred except that the primary relay PR² would have received its first energizing current in series with the cut-off relay 17 of the calling line.

As soon as both switches E and F complete their selection, the wipers 41, 42, 43 of master-switch G move away from contacts 44, 45, 46, of the switch pair EF in search of other similar contacts pertaining to an idle switch pair EF, it being understood that each switch pair EF serving a given hundred lines has its contact set 44, 45, 46, at the master-switch G of that one hundred lines. The master-switch G may be a simple rotary switch comprising the customary rotary ratchet, shaft and wipers and a magnet 40 having the customary ratchet driving pawl, the contacts 44, 45, 46, being arranged to form a complete circle. It will be observed that as soon as the two switches E and F have completed their selection, circuit is traceable from ground at normal contact 52 of relay RR, through normal contact 58, alternate contacts 55—60, normal contact 71, through contact 46—43, relay 39 of master-switch G to battery. Relay 39 thereupon attracts its armature, removing ground from the starting wipers 41, 42, and closes circuit for the stepping magnet 40 which thereupon steps the wipers 41, 42, 43, rotarily over the contacts 44, 45, 46, until they engage contacts of a normal, i. e., idle switch pair EF, the contacts 46 of busy switch pairs being grounded over circuits similar to that before described.

The multiple contacts 81, 82, 83, of the first selectors H, are preferably arranged in ten groups of ten contact sets each, before the wipers of switches F. Each such group of contact sets is provided with a multiple group contact 84 at the switches F. The contacts 84 of a group are connected to a conductor 84ª which may be extended through primary off-normal (PON) contacts 99, 99ª, 99ᵇ etc., to a ground connection. The contact 99, shown in Fig. 1, pertains to the first selector H of the group, contact 99ª is for the second first selector of the group, and 99ᵇ is for the third one and additional contacts 99, one for each of the other seven first selectors (assuming a group of ten) will be provided with similar connections. Thus, if all the first selectors H of a sub-group have been moved off-normal, the ten primary off-normal contacts 99 of these switches will be closed and the multiple group contacts 84 of the sub-group will be accordingly grounded. To take care of the condition arising when a first selector H has been selected, but has not been moved off normal, the relay SR² of each first selector is provided with an armature 95 having connections, adapted when the relay is energized to close a branch circuit about the off-normal contact 99 so that as soon as selector H is selected, the circuit of the group contact 84 is extended to the primary off-normal contact 99ª of the next first selector in the series.

As soon as relays PR² and SR² are operated, as before described, circuit is closed as follows: From battery B' through primary off-normal (PON) contact 100, normal contact 103, attracted armature 94 of relay PR², through normal contact at 124, relay 122 to ground, whereon relay 122 attracts its armature and closes a circuit extending from ground through said relay, armature 124, contact 131—135, over wire 139, switch 140, contact 141, and lamp 143 to battery, lighting said lamp at the operator's position to indicate the call. The wipers 128, 129, 130, 131, in the form of invention now being described, normally rest engaging the contacts 132, 133, 134, 135, pertaining to an idle operator's calling device and its associated signaling apparatus. As soon as relay 122 operated, as before described, a circuit was closed as follows: From ground through relay 85, attracted armature 123, contact 130—134, over wire 138, normal contact 156 and resistance 157 to battery. Ground through 85 now being placed upon the multiple contacts 134 of the operator's device, said contacts 134 will be rendered busy with respect to any other switch K engaging them. Thus, if at this time, more than one switch K had their wipers engaging the contacts 132, 133, 134, 135, of the calling device of Fig. 1, Part 3, all such switches K except that one connected with the first selector H would have their operating relays OR energized which relays would close the circuits of their respective magnets OM and the switches would initiate rotary travel after the manner of the master-switch G to seek out contacts of an idle operator's device. As soon as such contacts were encountered, the relays OR would be deënergized owing to the absence of ground upon he contacts 134 of such calling device and the switches would be arrested.

The operator observing the display of the call-lamp 143, associated with the calling device shown in Fig. 1, Part 3, actuates levers 155, 155$^a$, 156, of a listening key, levers 155, 155$^a$ then bridging her talking set across the wires 136, 137, which extend via wipers 128, 129, and contacts 126 and 127 to the first selector H and there terminate in armatures 86 and 87 of relay 85. The shifting of lever 156 deënergizes relay 85 by disconnecting battery from conductor 138 and retracted armatures 86 and 87 connect the operator's talking set with contacts 82 and 83 over which a talking circuit may be traced to the calling substation C$^5$ over the heavily marked conductors, such heavily marked conductors being employed throughout the drawings to indicate the course of the talking circuit established between subscribers. The operator now ascertains from the calling subscriber the number of the wanted called subscriber assumed to be 1233, whereafter the operator restores her listening key levers, thus permitting relay 85 to be again operated and its armatures attracted. The operator now presses down and releases once the button actuating the spring set marked "1" in Fig. 1, Part 3; then presses and releases the button actuating the spring set marked "2" and then presses and releases twice the button actuating the spring set marked "3". In the diagram of Fig. 1, Part 3, those parts of the mechanism pertaining to the thousands are indicated by reference characters employing the letter M; those parts relating to the hundreds are identified by the reference character letter C; the tens by D and the units by U. For each thousands digit to be transmitted, a relay is provided, the relay M' being the relay controlling the transmission of the thousands digit 1, the relay M$^2$ controlling the transmission of the thousands digit 2, and the relay M$^3$ controlling the transmission of the thousands digit 3. For each number 4, 5, 6, 7, 8 and 9, if such thousands digits were required, an additional relay would be provided having circuit connections corresponding to those of the relays M', M$^2$, M$^3$, as shown in Fig. 1, Part 3. Thus, the thousands digit relays will constitute a group. Similarly, for the hundreds, C' is the relay for the hundreds digit 1, C$^2$ for the hundreds digit 2, and C$^3$ for the hundreds digit 3 and other relays will be provided, for the other hundreds digits to be transmitted, the hundreds relays forming the second group. Similarly, relays D', D$^2$, D$^3$, are the relays for the tens digits 1, 2, and 3, and relays U', U$^2$, U$^3$, for the units digits 1, 2, and 3. The alternate contacts of spring 1$^b$, 2$^b$, 3$^b$, etc., of the operator's buttons are connected to wipers 160$^a$, 160$^b$, 160$^c$, etc., of an auxiliary switch 2$^A$. All of the wipers 160, of which there will be as many as there are digits to be transmitted, normally rest engaging contacts M connected to the thousands relays of their respective digit values. When as in the present instance, the thousands digit is 1 and the button actuating the springs 1$^a$, 1$^b$, is operated, the relay M' controlling the transmission of the thousands digit 1 will be energized and thereafter the wipers 160 will all simultaneously move to engage their second contacts, those connected with their respective hundreds relays, so that the spring sets 1, 2, 3, 4, etc., will then be all connected to their respective hundreds relays. When the button actuating the spring 2 is now operated, the relays C$^2$ controlling the transmission of the hundreds digit 2, will be energized and the wipers 160 will all be moved to the contacts D connected with the tens relays D', D$^2$, D$^3$, etc.; then when the operator actuates the button controlling the springs 3 which will energize the tens relay D$^3$ controlling the transmission of tens digit 3, the wipers 160 will all be moved to the contacts U connected with the units relays U', U$^2$, U$^3$, thereafter when the operator again depresses the button controlling the springs 3, the units relay U$^3$ controlling the transmission of units digits 3 will be energized and the wipers 160 move an additional step. The apparatus being now, by the operation of the required relays, in the thousands, hundreds, tens and units groups set for the transmission of number 1233, the operator will actuate the button of the starting springs S and the switch 3$^A$ will initiate its travel to transmit the number thus set up, the switch 2$^A$ being simultaneously restored to normal.

A general view of the operator's transmitting mechanism of Fig. 1, Part 3, having been given, its operation may now be referred to in detail. When the operator actuates the button associated with spring set 1, springs 1$^a$ and 1$^b$ momentarily engage their respective contacts. Current will then flow from ground through contact 1$^b$, through contact 160$^a$—M, through relay M' to battery, said relay M' then attracting its armature and locking itself via said armature $m'$, contact $rb$ and contact 142 to ground. Armature $m'$ also connects the ground at 142 with relay $M^2$ which operates to attract armature $m^2$ to lock itself to ground at 142 and armature $m^2$ similarly operates relay $M^3$ whose armature $m^3$ locks the relay to ground at 142. Armatures $m'$, $m^2$, $m^3$, have now removed ground at 142 from the first three contacts $M^a$ before the wiper 150 so that the fourth contact only remains grounded and but one impulse will be transmitted over wire 136 when wiper 150 passes over the contact $M^a$ in the manner presently to be described. The closing of contact $1^a$ for a moment energizes and deënergizes the operating magnet $O^2$ of switch $2^A$ and the armature controlled pawl 153 of said switch, on the deënergization of magnet $O^2$, steps its associated ratchet one step. Said ratchet is fastened to the shaft 159 to which also the wipers 160 are fastened so that the said wipers 160 are all moved from their thousands digits contacts M to their hundreds digits contacts C. When the button controlling spring set 1 rises and releases its springs, the electrical condition of the thousands relays remain unaltered as they are all locked as before described.

The operator now depresses and releases the button for spring set 2 whereon springs $2^a$ and $2^b$ momentarily engage their contacts. Circuit is then traceable from ground through spring $2^b$ over $165^b$, contact $160^b$—C, relay $C^2$ to battery. Relay $C^2$ attracts armature $c^2$ thereby locking itself from ground at contact 142 of switch $3^A$. Armature $c^2$ also connects said ground with the winding of relay $C^3$ which locks. It will now be observed that the first two contacts $C^a$ have been, by the operation of armatures $c^2$, $c^3$, ungrounded. The contact $C^a$ connected with armature $c'$, however, remains grounded and since the last contact $C^a$ is permanently grounded, the wiper 150 when it passes over the hundreds contacts $C^a$, will transmit two current impulses from ground over the wire 136. The momentary closing of contact $2^a$ energizes and deënergizes magnet $O^2$ whose attracted and retracted armature steps the shaft 159 a step so that wipers $160^a$, $160^b$, and $160^c$ are advanced a step to engage their tens contacts D respectively.

The operator now actuates the button for the spring set 3 twice. On its first actuation, current flows from ground through spring $3^b$, over $165^a$, contact $160^c$—D, relay $D^3$ to battery, said relay $D^3$, by armature $d^3$, then locking itself to ground at contact 142. The armature $d^3$ removes ground from one contact $D^a$ only in the tens group, the remaining three contacts $D^a$ remaining grounded so that when wiper 150 passes over said tens contact, it will transmit three impulses from ground over wire 136. The first actuation of the button controlling the spring set 3 will, in an obvious manner, produce a third step of wipers $160^a$, $160^b$, $160^c$, so that they will engage their fourth contacts U.

The next actuation of the button controlling the spring set 3 will close circuit from ground through spring $3^b$, through contact $160^c$—U, and through relay $U^3$ whose armature $u^3$ locks the relay and removes ground from the first one of the contacts $U^a$, the remaining contacts $U^a$ remaining grounded so that when wiper 150 passes over said contacts, it transmits three impulses from ground over the wire 136.

It will now be seen that when the wiper 150 is caused to make one complete revolution in the direction indicated by the arrow, it will pass over the various contacts $M^a$, $C^a$, $D^a$, $U^a$, transmitting to the wire 136, sets of impulses corresponding to the number of the called subscriber 1233. The wiper 149 being mounted on the same shaft 145, moves coincidently with the wiper 150 and as the said wiper 150 passes beyond the last contacts $M^a$, $C^a$, $D^a$, $U^a$, respectively, the wiper 149 will engage respectively the grounded contacts 151, 152, 153, 154, so that each set of impulses over wire 136 will be followed by a single impulse over the wire 137.

The operator now actuates the button controlling the starting spring set, S. The momentary engagement of spring $S^a$ with its contact, energizes and deënergizes release magnet $r^2$ of the switch $2^A$ and the attracted armature 164 is effective to withdraw the pawl 163 from the ratchet of shaft 159 and its associated spring now restores the shaft 159 and the wipers 160 to normal. The engagement of spring $S^b$ with its contact, closes circuit from ground over $165^g$, through magnet $O'$ of switch $3^A$ and an impulse from the associated generator actuates magnet $O'$ to advance the ratchet 148, fastened to shaft 145, a step. The spring 146 has a bent extremity normally engaging the notch in the disk shown fastened to shaft 145. On the first step of shaft 145, spring 146 rides upon the periphery of the disk and engages its contact, whereby the generator circuit of magnet $O'$ is continued when the momentary closing of contact $S^b$ ceases. It will now be apparent that until the armature actuated pawl of magnet $O'$ has been operated a sufficient number of times to cause a complete revolution of ratchet 148 and shaft 145, contact 146 will remain closed, the magnet $O'$ will receive successive impulses from the associated generator. As soon as one complete revolution is made, however, spring 146 again engages the notch of its associated disk and travel of the switch $3^A$ ceases. The wipers 149, 150 being fastened to shaft 145 will, of course, be rotated along with the ratchet 148 and will have completed one revolution when the switch 3^A stops, impulses being transmitted over wires 136, 137, as before indicated.

Just before the switch 3^A completes its revolution, an insulating pin 147 fastened in the disk mentioned, will pass over the top of the bent portion of spring 142, opening contact 142, and also contact 141. The opening of contact 142 unlocks all the relays M, C, D and U, that were energized and thus restores this portion of the calling device to normal. The opening of contact 141 terminates the flow of current previously passing from battery through lamp 143, over wire 139, contact 135—131, the attracted armature 124 and relay 122 to ground, whereby the relay 122 is deënergized and its armatures retracted, and the lamp 143 extinguished. The relay 122 is not again energized because the first step of first selector H will have opened the primary off-normal contact 100. On the retraction of armature 123 of relay 122, ground is removed from the multiple contacts 134 so that any other switch K, which in its travel engages the contacts 132, 133, 134, 135, may come to rest engaging such contacts. The apparatus of the operator's calling device, illustrated in Fig. 1, Part 3, has now been fully restored to normal and its associated trunk wires 136, 137, 138, 139, are now available for further use in putting through other connections.

At $r$ in Fig. 1, Part 3, I have indicated a spring set comprising springs $r^a$ and $r^b$. This spring set, when actuated, will restore the switch 2^A and any relays M, C, D, U, that may then be operated to normal, and is provided for the purpose of resetting the apparatus in case the operator may make a mistake in counting out the called number.

I have indicated at 165^a, 165^b, 165^d, 165^e and 165^g, switch levers which may all be mounted upon a common shaft 165. By turning the shaft 165, a single operator's set of buttons 1, 2, 3, etc., may be interchangeably associated with different calling device switches in an obvious manner. Preferably, however, each calling device is provided with a separate set of actuating buttons.

It will be observed that the spring 4^b is not provided with any associated contact and thus when the spring set 4 is actuated, no digit relay will be energized. It will be seen that for transmitting the largest digit of any set, all the contacts before the wiper 150 for that impulse group are to be left in their normal grounded conditions. In the present case, the impulse transmitter is arranged to transmit a maximum of four impulses. When the device is arranged to transmit sets of impulses from one to ten inclusive, there will of course be relays for each of the digits from one to nine inclusive, the button 10 having connections then arranged to correspond with those of button 4 indicated in Fig. 1, Part 3.

The method in which the first selector H, the second selector L and the connector M operate in response to the impulses transmitted by the mechanism in Fig. 1, Part 3, will now be described.

The first set of impulses transmitted, when wiper 150 moved over contacts M^a, consisted of one impulse, this passing over wire 136, contact 132—128, contact 126, alternate contact 86, relay PR^3 to battery, actuating said relay whose attracted armature first closed a maintaining circuit for secondary relay SR^2 extending through contact 90, attracted armature 88 and alternate contact 89, whereafter normal contact 89 is opened and relay PR^2 momentarily deënergized. On the deënergization of said relay, its armatures retract and an impulse of current is transmitted from ground through attracted armature 97, normal contact 92, contact 109, primary magnet PM^2 to battery, whereupon magnet PM^2 moves the switch wipers 119, 120, 121, one primary step to select the first group of contacts, said group forming terminals of second selectors L assigned for connection to the first thousand. With this first primary step, primary off-normal (PON) contacts 100, 101, 110, are shifted to their alternate positions. The impulse transmitted by wiper 149, Fig. 1, Part 3, over wire 137, passes through contact 133—129, contact 127, alternate contact 87, relay SR^3 to battery, this impulse following immediately after the deënergization of relay PR^3 and the re-attraction of its armature. The armature of relay SR^3 is attracted, first establishing a maintaining circuit for relay PR^2 extending through normal contact 89, attracted armature 88 and alternate contact 90, and then opens the circuit of relay SR^2, deënergizing the same. A current impulse then flows from ground through attracted armature 93, normal contact 98, contact 108, primary off-normal contact 110, shifted on the primary step, through busy relay BR^2 to battery, actuating said relay whose armature 116 connects its winding via contact 113 with the private wiper 119. Armature 117 now closes generator circuit for secondary magnet SM^2 which produces secondary steps of the first selector H which will continue until wiper 119 strikes an ungrounded, i. e., idle contact 166. As soon as this occurs, relay BR^2 deëngerizes and its armatures retract, armature 117 preventing further actuations of magnet SM^2, wipers 119, 120, 121, resting engaging the multiple contacts 166, 167, 168, terminals of the selected idle second selector L of the first thousand. It will be noted that while the wipers 120, 121, are passing over busy terminals 167, 168, they are on open circuit at contacts 115, 118. Armature 116 has placed ground upon multiple contacts 166, rendering them busy.

When wiper 150 passes over contacts C$^a$, two impulses will be transmitted over wire 136, energizing and deënergizing relay PR$^3$ twice, which relay produces two deënergizations of relay PR$^2$ while relay SR$^2$ remains energized. Each energization of relay PR$^2$ transmits a current impulse from ground through contact 97, normal contact 92, contact 115, 120—167, contact 170, magnet PM$^3$ to battery B$^3$. Magnet PM$^3$ then produces two primary steps of second selector L, moving wipers 180, 181, 182, adjacent to a group of multiple terminals 183, 184, 185, connected to connectors M assigned for connection to the second hundred of the first thousand. On the first primary step of switch L, the contacts 179 and 169 are shifted. After the transmission of the two impulses over wire 136 and the resulting two steps of switch L, a single impulse over wire 137 energizes and deënergizes relay SR$^3$ which deënergizes relay SR$^2$, while relay PR$^2$ remains operated. An impulse of current then flows from ground through contact 93, normal contact 98, contacts 118, 121—168, 171, contact 179, busy relay BR$^3$ to battery, actuating said relay which, by armature 176, connects its winding with the private wiper 180, and by armature 177, closes a generator circuit for secondary magnet SM$^3$ which now causes steps of wipers 180, 181, 182, over successive contact sets 183, 184, 185, until an idle, i. e., ungrounded set is encountered. As soon as this occurs, relay BR$^3$ will be on open circuit and on its deënergization its armatures are retracted, armature 177 opening the generator circuit of magnet SM$^3$, and by engaging its normal contact, said armature 177 places ground upon the multiple contacts 183 of the idle connector M to render them busy. The wipers 180, 181, 182, now rest engaging the multiple contacts 183, 184, 185, of the selected connector M. On the first secondary step of the switch L, the secondary off-normal (SON) contacts 170, 171, were shifted to their alternate positions.

When wiper 150 sweeps over contacts D$^a$, three impulses transmitted over wire 136 are effective to produce three deënergizations of relay PR$^2$ in a manner obvious from the preceding description and three impulses are transmitted from ground at armature 97 through contacts 92, 120—167, 181—184, normal contact 217, primary magnet PM$^4$ to battery, whereby three primary steps of connector M are produced to move wipers 214, 215, 216, to positions adjacent to a group of ten contact sets including those of lines 1231 to 1239 inclusive, followed by contact of line 1230. On the first primary step of connector M, the primary off-normal (PON) contacts 186, 187, 188, are all shifted to their alternate positions. After this adjustment, an impulse flowing over wire 137 deënergizes relay SR$^2$, an impulse of current flowing from ground at attracted armature 93 through contacts 98, 121—168, 182—185, normal contact 218, shifted contact 188, magnet SM$^4$ to battery B$^3$. Magnet SM$^4$ thereupon produces a secondary step of the connector M, but the switch wipers do not engage the first set of contacts of the selected group, the connector being so arranged that the wipers after their primary adjustment are two steps distant from the selected contact group. This first step, however, causes secondary off-normal contact 217 to engage its alternate contact, while contact 218 disengages its normal contact, but is not moved sufficiently to engage its alternate contact.

As wiper 150 continues its rotation passing over the contacts U$^a$, three deënergizations of relay PR$^2$ produced in an obvious manner, transmits three impulses from ground at contact 97 over the above traced path through contact 181—184, alternate contact 217, normal contact 192, secondary magnet SM$^4$ to battery, whereby three additional secondary steps of connector M are produced, and wipers 214, 215, 216, are moved to engage the contact set 22, 23, 24, of the third line of the group, said contacts being terminals of line 1233 whose substation is illustrated at D$^5$. Immediately following this, wiper 149 transmits an impulse over wire 137, the resulting deënergization of relay SR$^2$ transmitting an impulse of current from ground at attracted armature 93 over the before traced path, through contact 182—185, alternate contact 218 (said contact having been closed on the second secondary step of connector M), through contact 196, the lower winding of test relay TR to battery. Said relay thereupon attracts its armatures whereof 206 connects the relay's upper winding with the private wiper 214 to test the called-for line. Assuming first that the called line is idle, the condition illustrated, multiple contacts 22 are connected through normal contact 15 and the winding of cut-off relay 17 with the active side of battery B$^3$. As soon as the impulse through the lower winding of relay TR ceases, the relay will now deënergize, both terminals of its upper winding being connected to the active side of battery B$^3$. It will at this point be observed that the impulse through the lower winding of relay TR is momentary only because the attraction of its armature 207 instantly energizes relay 194 by current from battery through said relay, contact 207, normal contact 190, to ground. Relay 194, by armature 195, locked itself to ground at 190 and the attraction of armature 196 at once opens circuit through the lower winding of relay TR. On the deënergization of relay TR, circuit is traced from ground through relay 202, attracted armature 193, normal contact 206, contact 214—22, 15, cutoff relay 17 of the called line to battery, current over this path energizing both relays 202 and 17. The ground through relay 202 now connected to multiple contacts 22 renders the line of subscriber D busy with respect to incoming calls. Attracted armature 19 connects the ground upon contacts 22 with the multiple calling contacts 26 of the called line $D^5$, rendering them busy at the line selector, while armatures 18 and 21 disconnect the normal battery connections from line limbs 11 and 12.

Circuit may now be traced from ground through interrupter $I^2$, attracted armature 200, normal contact 209, the generator relay GR to battery $B^3$. As interrupter $I^2$ rotates, relay GR alternately energizes and deënergizes to periodically ring the bell of the called substation by current from the ringing machine associated with said relay GR. Said current passes through contact 215—23, over limb 12, through bell and condenser at the substation, returning over limb 11, contact 24—216, attracted armature 201, inductive resistance 203 to battery $B^3$ and ground.

When the called subscriber answers the call by removing his receiver from the hook switch, and, as soon as the armature of relay GR is retracted, the relay $RR^5$ is energized by current from ground through said relay, attracted armature 199, contact 215—23, limb 12, the transmitter, raised hook lever and impedance coil at substation D, returning over limb 11, contact 24—216, armature 201, inductive resistance 203 to battery. Attracted armature 197 of relay $RR^5$ instantly operates relay 211 which, by armature 210, locks itself to ground at normal contact 190, armature 209 opening the circuit of relay GR so that its actuations cease and generator current remains excluded from the called line. Armature 212 closes a contact in the circuit of the relay 189, but said relay is not operated at this time, and contacts 208, 213, are closed, completing the talking circuit to the called-for line.

On the attraction of armature 213, the ground through relay $RR^5$ is extended over the limb of the called line from said contact 213 to the left through alternate contact 218, contacts 185—182, 168—121, alternate contact 98, release relay $RR^3$ to battery B'. Armature 106 of relay $RR^3$ operates relay 102 which, by armature 104, locks to ground at armatures 92 and 97, the first selector H being thereby prepared for release when the called subscriber hangs up his receiver.

The calling and called subscribers $C^5$ and $D^5$ are now in conversation, talking current being supplied to the calling line from the serially connected batteries $A^2$ and $B^2$ through the impedances of relay $PR^2$ and $SR^2$, while current is supplied to the calledfor line for talking purposes through the impedance of relay $RR^5$ and impedance 203, the different portions of the talking circuit being connected by the condensers at first selector H. When they finish their conversation, the connected subscribers replace their receivers. If subscriber $D^5$ does so first, switches H, L and M are automatically restored to normal, switches E and F remain to be restored when subscriber $C^5$ replaces his receiver. If subscriber $C^5$ replaces his receiver first, switches E, F, H and L are restored to normal switch M remaining to be restored to normal when subscriber $D^5$ replaces his receiver.

Assuming that subscriber $D^5$ first replaces his receiver, relay $RR^5$ at switch M and relay $RR^3$ at switch H are deënergized because their circuits depend upon current over the called-for line which circuit is opened now at hook switch 10. On the deënergization of relay $RR^5$, the closure of contact 198 connects battery $B^3$ through attracted armature 212 with the winding of relay 189. Said relay 189 operates, and by armature 190, energizes release magnet $RM^4$ which withdraws the retaining pawls from the primary and secondary ratchets of connector M which is then restored. Retracted armature 197 deënergizes relay 211 whose armatures are immediately retracted. Attracted armature 190 of relay 189 also deënergizes relay 194 by opening its locking circuit and retracted armature 193 of said relay 194 then deënergizes the relay 202. Until the connector M reaches normal, relay 189 remains operated by current through its attracted armature 191 and alternate contact 187 to battery.

On the deënergization of relay $RR^3$ at switch H, circuit may be traced from ground at switch 101 through attracted armature 105, retracted armature 107, relay $RR^2$ to battery B', said relay $PR^2$ by armature 112 locking itself to ground at contact 101. Armature 111 of relay $RR^2$ energizes relay $BR^2$ by current through the shifted contact 110. As soon as relays $RR^2$ and $BR^2$ are both energized, current flows from ground through alternate contact 117, alternate contact 114, release magnet $RM^2$ to battery, actuating said magnet, which withdraws the primary and secondary retaining pawls and allows the restoration of the first selector H. When the switch H reaches normal, the opening of contact 101 deënergizes relay $RR^2$, and the opening of contact 110 deënergizes relay $BR^2$. Because of the opening of alternate contact 114, release magnet $RM^2$ is also deënergized and the first selector is at normal except for the associated relays 102, $PR^2$, $SR^2$, which remain operated until the calling subscriber hangs up his receiver.

Immediately upon the energization of relay RR², as before described, an impulse of current passed from battery B′ through alternate contact 113, normal contact of the armature of magnet RM², before said magnet energized, through contact 119—166, closed contact 169, release relay RR⁴ to ground, actuating said relay which, by armature 172, energized relay BR³ by current through closed contact 179. As soon as relays RR⁴ and BR³ are both energized, release magnet RM³ energizes by current from battery B³ through said magnet, attracted armatures 173, 177, to ground. The actuation of magnet RM³ restored the second selector L to normal, and as soon as normal is reached, the opening of contact 179 through which relays RR⁴ and BR³ were operated in series, deënergizes said relays and the mechanism of the second selector L is then at normal.

When, now, the calling subscriber C⁵ replaces his receiver, relays PR² and SR² are simultaneously deënergized, now for the first time since the first selector H was connected with. Circuit may now be traced from battery B′ through relay RR², normal contacts 96, 91, contact 81—76, armature of release magnet RM′, normal contact 70, lower winding of release relay RR′ to ground; attracted armature 65 locks relay RR′ by current through its upper winding, closed contact 62, normal contact 64 to ground. Current from ground at 64 now also finds its way through attracted armature 65, release magnet RM′ to battery, actuating said magnet which restores the automatic switch F. Armature 66, by engaging contact 68, has operated secondary relay SR′ by current through alternate contact 80; and through the closing of contact 66—67, places ground in connection with the lower winding of relay RR of switch E, which relay operates and, by armature 51 locks itself to ground at closed contact 48 and normal contact 50. Current from ground at 50 also finds its way through armature 51 and through release magnet RM which energizes, restoring switch E to normal. The attracted armature 52 of relay RR holds the relay SR energized while the switch E is being restored so that wipers 31, 32 are on open circuit. When switch F restores, the opening of contact 62 deënergizes relay RR′ and release magnet RM′, while the shifting to normal of contact 80 deënergizes secondary relay SR′. So when switch E reaches normal, the opening of contact 48 deënergizes relay RR and magnet RM, while the opening of contact 54 deënergizes relay SR.

As soon as relays PR² and SR² deënergized, as before mentioned, relay 102 had its circuit opened and its armatures were retracted.

As soon as magnet RM at switch E was actuated, its attracted armature opened the circuit through cut-off relay 17 at the calling line C⁵ whose retracted armatures place the line circuit of C⁵ in its normal condition. While the switches E and F were being restored to normal, each of them maintained a ground upon their contact 46 at the master-switch G, the ground at switch E being traced through attracted armature of magnet RM, alternate contact 57, alternate contact 54, and alternate contact 52; and in the case of switch F, through attracted armature of magnet RM′, alternate contact 70, alternate contact 80 and contact 68—66.

Assuming now that the subscriber C⁵ replaces his receiver in advance of subscriber D⁵, switches E, F and H would have been restored in the manner already described. The closing of normal contacts 91, 96, would have operated relay RR² over the circuit before traced, and its operation would have produced circuit changes similar to those before described resulting in the restoration to normal of switches H and L; then when the called subscriber D replaced his receiver, the switch M would be restored in a manner similar to that before described.

Let it now be assumed that the called line D⁵ was busy at the time the test relay TR was initially operated as before described. In such case, its multiple contacts 22 will be grounded. If the line of D⁵ is busy as a called line, ground will be placed upon the multiple contacts 22 over wiper 214 of another connector M which has already seized the called line, the circuit to ground being traced through relay 202 of said other connector. In case the calling line is busy, because a line selector E has selected the same, its multiple contacts 22 will be connected to ground through normal contact 15 of the line circuit of D, alternate contact 19, a multiple contact 26 and a wiper 30 in connection with said multiple contact, and through normal contact 57 of such line selector to ground. In either case, attracted armature 206 of test relay TR will lock said test relay to ground at busy contact 22. Attracted armature 207 operates relay 194, as before, but relay 202 fails to operate because armature 206 continues attracted. Since the armature 205 continues attracted, the busy signal is transmitted from interrupter I³, through contact 205, to the left over the upper talking conductor, through the calling substation C⁵, giving the busy signal in the receiver, returning to the exchange and over the lower talking conductor and through the winding of relay SR² to ground. The calling subscriber hearing the signal and knowing that the called line is busy, replaces his receiver causing the restoration of switch E, F, H and L, in the manner before described. Under these circumstances, the switch M is also restored to normal because relay 211 has not been energized and its contact 211$^a$ is therefore closed, so that, as soon as relay RR$^4$ at switch L attracts its armature 174, and before release magnet RM$^3$ attracts its armature, an impulse of current will flow from battery B$^3$ through alternate contact 174, contact 180—183, closed contact 186, normal contact 211$^a$, and the relay 189 to ground, which relay operates, and, by armature 190, energizes release magnet RM$^4$ whereby the connector M is restored to normal, as before described.

If the called line had been in an exchange distant from that in which the line of subscriber C$^5$ terminates, the first selector H would have been operated to select a group of contact sets 219, 220, 221, having connections as indicated in Fig. 2. In considering the connections between distant exchanges, Fig. 2, is to be substituted for the circuit indicated at L in Fig. 1, Part 4. In such cases, the trunk selector Q of Fig. 2 is assumed to be located in the distant exchange in which the connector M of the called line is also located, while the trunk circuit indicated at O is assumed to be in the same exchange in which the line of C$^5$ terminates, the wires 241, 242, being the long trunk wires extending between the two exchanges.

Fig. 2 being substituted for the circuit indicated at L, it being assumed that the first selector H has been operated to select a group of trunk circuits O and then an idle trunk circuit out of such group, in a manner which will be understood from the previous description. It will be noted that the second set of impulses consisting of two, transmitted by deënergizations of relay PR$^2$, will pass from ground through contact 120—220, and through relay PR$^5$ to battery B$^4$. Relay PR$^5$, when first energized by armature 232, energizes relay 227 which, by armature 229, in turn actuates the slow release relay 223. The latter, by armature 224, locks itself to ground at the armature of relay 222. Relay 227, by armature 228 meanwhile locked itself to ground at contact 219—119, traced through normal contacts 113, 116. Each attraction of the armature 233 of relay PR$^5$ transmits a current impulse from ground over the trunk wire 241, normal contacts 246, 256, relay PR$^4$ to battery, causing two energizations and deënergizations of said relay. The armature 243 of relay PR$^4$ transmits two current impulses through normal contacts 264, 262, primary magnet PM$^5$ to battery B$^5$, whereby wipers 273, 274, 275, are adjusted to select the second group of connector contacts 183, 184, 185. On the first step of the trunking second selector Q, primary off-normal contacts 259, 260, 261, are shifted to their alternate positions.

A secondary impulse transmitted on the deënergization of relay SR$^2$ at first selector H, energizes and deënergizes relay SR$^5$ whose attracted and released armature transmits a current impulse over wire 242 to the distant exchange through normal contact 247, secondary relay SR$^4$ to battery. Attracted and released armature 248 of relay SR$^4$ transmits a current impulse from ground through closed contacts 260, 263, and busy relay BR$^5$ to battery and said relay BR$^5$ by armature 270 connects its winding via normal contact 267 to the private wiper 273. Armature 271 closes generator circuit for secondary magnet SM$^5$ which now moves the wipers 273, 274, 275, on their secondary travel over successive sets of contacts 183, 184, 185, to select the contacts of an idle connector. Secondary off-normal contacts 262, 263, are shifted on the first secondary step of switch Q so that relay BR$^5$ thereafter depends upon grounded contacts 183, encountered by wiper 273, for its continued energization. As soon as an ungrounded, that is, an idle contact 183 is encountered, circuit through relay BR$^5$ is open and its armatures retracted, armature 271 preventing further actuations of secondary magnet SM$^5$.

The next set of impulses transmitted by the deënergization of relay PR$^2$ at H, energize relay PR$^5$ which in turn energizes relay PR$^4$ a corresponding number of times. For each energization of relay PR$^4$, an impulse of current is transmitted from ground through armature 243 to the right through normal contact 269, contact 274—184, and through the primary magnet of the connector M, causing the primary adjustment of said connector in a manner understood from the preceding description. So the secondary impulse transmitted by the relay SR$^2$ operates relay SR$^5$ which operates relay SR$^4$ which transmits a current impulse by armature 248 from ground through contact 272, contact 275—185, to the connector, adjusting the same as before described. From this point on, up to the connection of the calling line with the called line, the operation of Fig. 2 and of the connector M is effected in a manner which will be obvious from the previous descriptions. The test and ringing of the called-for line proceeds in the manner before described. When the called subscriber answers, the ground through relay RR$^5$ at M is connected over limb 12—11 of the called line and contact 213 via alternate contact 218, contact 185—275, to normal contact 248 through the winding of relay 245 and battery. Energized relay 245, by its armatures 246, 247, now disconnects trunk wires 241, 242, from relays PR$^4$ and SR$^4$. Attracted armature 246 closes a circuit from ground at relay 251 over trunk wire 241, normal contact 233, through polarized relay 238, in a direction to tilt its armature upward; thence through normal contact 240, normal contact of relay SR⁵, trunk wire 242, alternate contact 247, normal contact 248, relay 245 to battery. The up-tilted armature of relay 238 actuates the relay 234 which, by armature 236, locks itself to ground at contact 219—119. Armatures 235, 237 are now attracted, completing the talking circuit at O. Armature 237 establishes a substitute circuit for relay 251 before contact 240 is broken, said substitute circuit extending through contact 221—121, alternate contact 98, release relay RR³ to battery B'. Relay RR³ is thus energized, and actuates relay 102 for the purposes before specified. Attracted armature 252 of relay 251 at Q has now actuated relay 254 which, by armature 257, locks to ground at primary off-normal contact 259. Armature 255 short circuits a condenser in the upper talking conductor and the conversational circuit between substations C⁵ and D⁵ is now complete, being traced from substation C⁵ to substation D⁵, through the exchange by the heavily marked conductors, transmitter current being supplied to the calling and called telephone just as in the case in which the line of C⁵ was connected with another line terminating in the same exchange.

If, at the conclusion of conversation, subscriber D⁵ first replaces his receiver, switches H, Q, M and trunk circuit O are restored to normal, switches E and F remaining to be restored when the calling subscriber C⁵ replaces his receiver. If the calling subscriber C⁵ were to first replace his receiver, all the switches would be restored except connector M.

Thus when subscriber D⁵ replaces his receiver, he opens the conductive circuit at the substation, deënergizing the relay RR⁵ at M, and relay 245 at Q, these two relays being dependent upon the line circuit for their energizing current. The deënergization of relay RR⁵ at M restores the connector in the manner before described. The deënergization of relay 245 at Q opens the circuit including relay RR³ at H and the deënergization thereof restores the first selector H as before. Attracted armature 246 also deënergizes relay 251 at Q, whereupon current flows through protective resistance 250, contacts 253, 258, release relay RR⁶ to ground, energizing said relay, which locks, by armature 265, to contact 261 in series with relay BR⁵. Magnet RM⁵ thereupon energizes by current to alternate contacts 271, 266, and the second selector Q is restored, the opening of the primary off-normal contacts resulting in the deënergizations of relays 254, RR⁶ and BR⁵ and of release magnet RM⁵. As soon as ground is removed from contact 119—219 in the restoring process of switch H, the relays 234 and 227 deënergize; and on the closure of contact 231, current flows through the right winding of relay 222, whose attracted armature restores the slow release relay 223, and when its armatures retract, they deënergize the relay 222.

Were the calling subscriber C⁵ to first replace his receiver, switches E, F and H would restore as before; and as soon as contact 121—221 had, by the restoration of switch H, battery disconnected from it, the relay 251 at Q would deënergize and restore the switch Q as before described, the switch M then remaining to be restored by subscriber D⁵. If the called line D⁵ had been found busy so that the busy signal was transmitted back over the upper talking conductor and its associated condensers to substation C⁵, the calling subscriber would replace his receiver and the restoration of switches E, F and H would proceed as before. Under these circumstances, the removal of ground at switch H from contact 119—219 causes the restoration of switches Q and M. The removal of the ground, of course, deënergizes relay 227. On the closure of contacts 230, 231, the windings of relay 222 will be bridged across the trunk wires 241 and 242 through contacts 225, 226. Since, on account of the called line being busy, the relay 245 has not been energized, the simultaneous grounding of wires 241, 242 results in the simultaneous energizations of relays PR⁴ and SR⁴, whereupon circuit is closed from battery B⁵, through armatures 249 and 244 and release relay RR⁶ to ground, said release relay then operating to restore the selector Q. The ground upon wires 241, 242 is momentary only, because on the energization of relay 222 it opens the circuit of slow release relay 223 and contacts 225, 226 accordingly open. When, under the described circumstances, relay RR⁶ at Q first energizes, current flows from battery B⁵, through resistance 268, alternate contact 267, armature contact of magnet RM⁵, before said magnet attracts its armature, contact 273—183, contact 186 at M, contact 211ª and through relay 189 to ground, operating said relay, which energizes release magnet RM⁴ to restore the connector M.

Fig. 3 is adapted to be inserted in the place of Fig. 1, Part 2, and will be considered in this connection. The wipers 119, 120, 121, are to be placed adjacent to contacts 166, 167, 168, of Fig. 1, Part 4. The wires 136, 137, 139, of Fig. 3 connect to the correspondingly numbered wires of Fig. 1, Part 3, wire 138 not being required in this connection.

In the present instance, a selective switch Y is provided for the first selector circuit X, having a definite normal position; the wipers 286, 287, 288, being restored to normal after each use of the selector X and switch Y. The contacts 132, 133, 135 are preferably multiplied in serial order before all the switches Y, and the first set or sets of contacts preferably lead to a calling device or devices at a first operator's position; the next contact sets will lead to calling devices at the second operator's position; and so on to other operators' positions. By this means, whenever switch Y leaves normal, it will first test the devices of the first operator, then those of a second operator, thereafter those of a third operator, stopping in connection with the first idle device encountered. By this means, an automatic concentration of business at one end of the switchboard is secured. If the number of first selectors X is so great in an exchange that it is not desired to multiple each operator's device before the switch Y of each selector X, then the said selectors may be divided into groups and a certain number of devices assigned to each group by having their contacts 132, 133, 135 multiplied serially before the switches Y of a group of switches X. In such case, the first contact set or sets in all groups would preferably be connected to calling devices at the first operator; the next contact set or sets to calling devices of the next operator; and so on, so that where a plurality of groups of switches X are provided, the automatic concentration of business at one end of the operator's switchboard is still preserved.

It will be seen that when a switch pair EF has automatically extended connections from a calling line $C^5$ to a first selector X, the relays $PR^2$ and $SR^2$ will be energized in the manner that similarly designated relays were energized when Part 2 of Fig. 1 was used. On the energization of relay $PR^2$, circuit is closed from ground at primary off-normal contact 100 through normal contact 103, contact 94, contact ON at Y, and to battery through relay $OR^3$, operating said relay which, by armature 281, closes generator circuit for stepping magnet $OM^3$ and, by armature 282, connects its winding to private wiper 288. Magnet $OM^3$ now moves wipers 286, 287, 288, to rotate over their contacts 132, 133, 135, and such rotation will continue as long as relay $OR^3$ continues energized, due to wiper 288 finding ground upon contacts 135 of busy operators' devices. The initial energizing circuit of relay $OR^3$ is broken at off-normal contact ON on the first step of switch Y. As soon as wiper 288 encounters a contact 135 of an idle operator's device, such contact will be ungrounded and relay $OR^3$ deënergizes, armature 281 preventing further actuation of magnet $OM^3$, while armature 282, by engaging its normal contact, places ground upon the contacts 135 of the selected operator's device, rendering them busy. Furthermore, relay 283 is now energized by current over wire 139 and through signal lamp 143 to battery, said lamp being displayed to signal the operator as before. Wipers 286, 287, now of course engage the contacts 132, 133, of the selected operator's device, and the energization of relay 283 has closed contacts 284, 285, whereby the impulse wires 136, 137 of the operator's device are connected to the relays $PR^3$ and $SR^3$ of first selector X. In the present case, the operator converses with the calling subscriber through the condensers 278, 279. The calling device of Fig. 1, Part 3, is set to transmit the called number as before. The transmitted impulses are prevented from making an objectionable noise in the receiver at substation $C^5$ by the shunt established at contact 277, operated as an off-normal contact and closed on the first step of the switch Y. Said contact 277 will be opened by the restoration of switch Y, later described, and the shunt removed. The operations of the switch X are like those of the switch H of Fig. 1, Part 2, and do not require a special description. As switch $3^A$ completes its revolution, contact 141 opens and relay 283 deënergizes. On its deënergization, it withdraws a retaining pawl from the spring-controlled rotary shaft of the switch Y, and the wipers 286, 287, 288 of said switch automatically turn back to their normal position, whereby the operator's calling device is freed for further use. I have indicated, in association with switch Y, a magnet 280 connected to the last private contact $135^a$, its function being to automatically restore the switch Y in case all the operators' devices, having multiple contacts at said switch, are busy. Thus, if wipers 286, 287, 288, rotate to the last position so that wiper 288 engages contact $135^a$, relay $OR^3$ deënergizes, both terminals of its winding being connected with the active side of battery; and as soon as armature 282 engages its normal contact, electromagnets 283 and 280 operate in series. Magnet 280 attracts its armature and opens the circuit so that magnet 238 deënergizes and restores switch Y, which thereon will re-begin its travel, operating and releasing until one of the contact sets of the operators' devices becomes idle.

Let Fig. 4 now be inserted in place of Fig. 1, Part 2. When thus placed, it will be understood that the wires 136, 137, 138, 139 connect with the correspondingly numbered wires of Fig. 1, Part 3.

Let it again be assumed that a switch pair EF has connected the calling line $C^5$ with a first selector now designated Z in Fig. 4. The wires 136 to 139 lead to one operator's calling device, while wires $136^a$ to $139^a$ lead to another, and it will be understood that there will be as many sets of wires 136—139 as there are calling devices associated with the group of first selectors. Each first selector has for each calling device adapted to be connected with it a pair of relays. Thus the first selector Z has for the first calling device the relays 307ª, 311ª, and for the second calling device the relays 307, 311. The wires 136, 137, 138, 139, are in the present instance multiplied to armature switch contacts of the relays 311ª, 411ª of the first selectors adapted to make connection with said wires, instead of being multiplied to traveling switches associated with the first selectors.

Similarly, the wires 136ª, 137ª, 138ª, 139ª are multipled to the alternate switch contacts of relays 311, 411, etc., of the different first selectors adapted to make connection with said wires. For each group of relays 311ª, 411ª, etc., 311, 411, etc., there is a common or group relay 306ª or 306. The function of a group relay, for example 306ª, is, when one of the relays 311ª or 411ª, etc., is operated (whereby the associated calling device is seized by some first selector), to switch the seized calling device out of operative relation with the relays of all other first selectors normally having access to such calling device and to place the adjacent calling device in operative relation with said other first selectors. When a seized calling device has completed its operation and transmitted the selective impulses, the group relay 306ª or 306, associated with such calling device, will again be deënergized and the device be available for seizure by some other first selector.

In the present instance, the manually operated switches 144 and 144ª of Fig. 1, Part 3, are to be thrown to their alternate positions and so permanently left, each being thus connected to ground instead of to battery.

When, on the selection of the switch Z by switch F, the relays PR² and SR² are energized, circuit is closed from ground, through contacts 301 and 94, and relay 307ª to battery, which relay immediately operates. Assuming now that the first operator's calling device—that connected to wires 136 to 139—is idle, the armature of relay 306ª will be engaging its normal contact so that attracted armature 309ª of relay 307ª operates the relay 311ª over wire 320ª to ground. The actuated relay 311ª, by armature 312ª, locks itself to ground over wire 139 and through the signal lamp 143, displaying it to warn the operator of the call. Attracted armatures 314ª, 315ª, 316ª, connect the wires 136, 137, 138 of the operator's calling device to the mechanism of the first selector Z, rendering the latter directively operable, responsive to current impulses to be transmitted by the calling device in a manner similar to that in which the first selector H of Fig. 1, Part 2, operated. By the closing of contact 314ª, ground over wire 138 is connected with relays 85 and 300 at first selector Z in parallel, so that said relays operate; relay 300, by armature 302, locking itself to ground at alternate contacts 92, 97. Attracted armature 301 instantly takes ground from relay 307ª which now deënergizes, whereupon circuit is traced from ground through normal contact 310ª, contact 313ª, over wire 318ª, and through the group relay 306ª to battery, energizing the said relay whose attracted armature, as before indicated, cuts into operative relation with the first selectors the operator's calling device of the wires 136ª to 139ª. Thus, suppose that after this, the first selector, whose relays are indicated at 407, 411, 407ª, 411ª, is selected by some switch F. Its operated relay PR², by armature 94, will energize the relay 407ª. The associated relay 411ª will, however, fail to operate on the attraction of armature 409ª, because the ground has been removed from the normal contact of the armature of relay 306ª. Current will, however, flow from ground through alternate contact of relay 306ª, alternate contact 408ª and through the second relay in series, 407, associated with this other first selector. Operated relay 407, by armature 409, actuates relay 411 by current to ground at the normal contact of relay 306, whereupon the relay 411 locks, by armature 412, over wire 139ª, through the lamp 143 of its particular calling device, to ground. From this point, circuit changes occur in a manner corresponding to that before described, resulting in the operation of the group relay 306 of this other calling device, whereby the third calling device in series will be operatively associated with the remaining first selector Z, and so on for other calling devices.

Returning now to the connection traced between the first selector Z of Fig. 4 and the calling device of Fig. 1, Part 3, the operator ascertains the called-for subscriber's number by actuating the levers 155, 155ª, 156 as before. The grounded alternate contact of lever 156 is left disconnected in the present case, so that on the actuation of the listening key the relay 85 at Z may deënergize and connect the operator's talking set with the talking circuit extending to the calling substation. When the operator restores her listening key, the relay 85 is again operated, whereby relays PR³ and SR³ are connected to the impulse transmitting wires 136, 137, of the calling device. The latter is actuated as before, and the travel of the switch 3ᴬ transmits the necessary impulses to connect with the called line. As switch 3ᴬ reaches normal, contacts 142, 141 are opened, the opening of the latter putting out lamp 143 and deënergizing the relay 311ª previously held energized in series with said lamp. At the opening of contact 313ª, group relay 306ª deënergizes and the operator's device of Fig. 1, Part 3, having been disconnected from the first selector Z, it may now be seized by any other first selector by means of the associated relays of such selector. A re-operation of relay 307ª is prevented prior to disconnection of the subscribers' lines because of the continued operation of the relay 300. When, at the time of disconnection, the relays PR² and SR² are deënergized, a re-operation of relay 307ª is prevented by the opening of contact 94 before armature 301 retracts. The operation of first selector Z being similar to that of first selector H of Fig. 1, except in the particulars hereinbefore referred to, further description thereof is unnecessary.

Let Fig. 5 be now placed between Fig. 1, Part 1, and Fig. 1, Part 4, and the circuit of the operator's calling device mechanism, illustrated in Fig. 6, be placed above Fig. 5, whereby a complete circuit diagram, illustrating another modification of my invention, is completed.

In this circuit diagram, the interconnection between the first selectors R and the operator's calling devices, Fig. 6, is procured by means of traveling switches. Instead, however, of having one traveling switch for each first selector, there are only as many traveling switches as there are operators' devices. Thus the wires 519, 520, 521, 522, forming the link connecting an operator's device with the exchange at which the first selectors R are located, are connected at one end with the operator's device, Fig. 6, and at the other end with wipers 500, 501, 502, 503, of a selective switch. Assuming a plurality of operators' calling devices and a plurality of switches W, whenever a pair of switches EF have connected a first selector R with the calling line, an idle switch W will be set in travel to connect its individual calling device with the first selector R already placed in connection with the calling line.

The first selectors R are provided with multiple terminals 504, 505, 506, 507, one set being provided at each of the switches W connected with calling devices assigned to a group of first selectors R. Normally, the multiple contacts of the switches R at the switches W are unselectable in character, but when any switch R is connected to a calling line, the electrical condition of its multiple contacts is changed so that any switch W, which is set in motion, will stop engaging its multiple contacts.

A master-switch T is provided, common to a group of first selectors R and the associated group of automatic switches W. The switch T is rendered common to the group of first selectors by the common wire 539, having branches extending to normal contacts 301ª of all the first selectors R, the other end of said common wire 539 being connected with a master-switch relay 526. As in the case of the master-switch G of Fig. 1, Part 1, the master switch T normally rests engaging by its wipers 523, 524, the contacts 525, 526, of an idle automatic switch W, it being understood that the wipers 523, 524, when traveling, always rotate in one direction and have no back movement. The contact sets 525, 526, of the switches W, one set being provided for each switch, are arranged in a circle for engagement by the associated wipers.

The selective switches W have a forward direction of travel and a reciprocal return movement when they are to be restored. The wipers 500 to 503 may be mounted on the customary rotary shaft provided with a ratchet adapted to be driven by an armature controlled pawl of operating magnet O⁴; the customary retaining pawl may be provided, and the release magnet R⁴, when energized, may cause a suitable device to engage the retaining pawl and then, when deënergized, withdraw the said pawl from the ratchet, whereby an associated spring is effective to return ratchet, shaft and wipers to normal, all in the well known manner.

Assuming that a switch pair EF has connected the calling line C⁵ with the first selector R of Fig. 5, relays PR² and SR² energize as before, their circuits being traced respectively through contacts 86ª and 87ª. Attracted armatures 92 and 97 connect the winding of the common master switch relay 526 to ground via contact 301ª whereupon armature 527 connects the ground at normal contact 529 via contact 523—525, with the relay 508 of switch W and battery. Attracted armature 509 connects the winding of relay 508 to the private wiper 503, while armature 510 completes the generator circuit for the operating magnet O⁴ which now steps wipers 500 to 503 rotarily over the contact sets 504 to 507. As long as wiper 503 continues moving over contacts 507 of first selectors R not connected with calling lines, relay 508 will continue energized by successive locking circuits extending to grounds at normal contacts 94 of such first selectors. As soon, however, as wiper 503 engages a contact 507 of an unselected and normal first selector R, whose relay PR² is energized, relay 508 deënergizes because armature 94 of such first selector is attracted and ground so removed from the contact 507 engaged. Wipers 500, 501, 502, 503, then rest engaging contacts 504, 505, 506, 507, of the first selector R connected to calling line C⁵ because the retraction of armature 510 prevents further actuation of magnet O⁴. On the first step of the switch W, off-normal contacts 512, 513, were shifted in the well known manner to their alternate positions, the shifting of 512 rendering relay 508 solely dependent for current upon the wiper 503. When, now, relay 508 deënergizes, circuit is closed from ground through normal contact 510, closed contact 513, to the contact 526 of switch W, engaged by wiper 524 of master-switch T, whereby relay 528 of such master-switch is actuated and closes the generator circuit for the associated magnet 530 which steps the wipers 523, 524, rotarily until relay 528 deënergizes, owing to wiper 524 having engaged the contact 526 of an idle switch W. The master-switch T will then stop with its wipers engaging the contacts of such idle switch W, ready to start the same as soon as another first selector of the group has been connected with a calling line.

As soon as relay 508 deënergized as described, circuit was closed from battery, through release magnet R⁴ at W, normal contact 511, shifted off-normal (ON) contact 518 of switch W, over wire 522, to ground through contact 141 in Fig. 6. Actuated magnet R⁴ now attracts its armatures 514 to 517 inclusive, armature 517 connecting ground upon the multiple contacts 507 of the first selector R, rendering said multiple contacts at the various switches W unselectable. Relay 611 is now actuated to display the call signal 614, by current from ground through listening-key contact 615, over wire 521, contacts 516 and 502—506, through relay 85ª to battery B¹⁰. The resulting energization of relay 85ª disconnects relays PR² and SR² from the calling line, but they remain energized because current through them continues over wires 532, 533, 519, 520, to contacts 610, 601, respectively, and to ground at attracted armature 612. The operator now actuates cam 618 of her listening-in key, closing contacts 616—617 to connect her talking set across wires 519, 520, said cam simultaneously opening the contact 615, whereby relays 611 and 85ª are deënergized. The deënergization of relay 85ª is now operative to reconnect relays PR² and SR² with the calling line and also to connect the wires 532, 533, therewith, whereby the operator may converse with the calling subscriber and learn the wanted number. The circuits of relays PR² and SR² to ground at attracted armature 612 in Fig. 6 continue until after new circuits are established for said relays including the calling line circuit, since relay 611 is provided with a copper shell about its core to render it slow to release its armatures as compared with relay 85ª.

The operator, having learned the called number, restores her listening-key, whereon relays 85ª and 611 again operate and relays PR² and SR² are again connected to ground at armature 612 without becoming deënergized.

The operator now counts out the called number as before, setting it up on her calling device by actuating the appropriate spring sets 1, 2, 3, as before.

In the first selector R, the relays PR³ and SR³ employed in the first selectors heretofore described which control the relays PR² and SR² are omitted, the operator's calling device at Fig. 6 operating directly upon the relays PR² and SR² to control the selective switches. The operator's calling device in Fig. 6 is accordingly somewhat altered from that shown in Fig. 1, Part 3. The relays M, relays C, relays D, and relays U are adapted to be selectively energized by the spring sets 1, 2, 3, and 4, the general arrangement if this portion of the apparatus being largely similar to that of the operator's device before described. Thus the operator in counting out 1233, will energize relays M', C², D³, and U³ which relays will be locked by their respective armatures to ground via normal contact 142 and contact Rᵇ. In this operator's device, however, it will be observed that the energization of relay M' does not effect any of the other M relays and the same is true relatively of the relays C, D and U. The contacts Mᵐ, Cᶜ, Dᵈ and Uᵘ are all normally ungrounded and it will be also observed that the operations described of relays M', C², D³ and U³ are effective to ground respectively, the last contact Mᵐ, the third contact Cᶜ, the second contact Dᵈ and second contact Uᵘ.

When now, the operator actuates the starting spring set S, magnet r² restores wipers 160 as before and spring Sᵇ energizes magnet O' which receives actuations from its associated generator until shaft 600 with its attached ratchet and the wipers 601, 603, 605, 607, complete one revolution; when the opening of contact 146 will prevent further actuations of said magnet O'.

The wiper 607, by its control of relay 607ª, causes connection of wire 519 controlling the primary relay PR² with the ring 604 of impulse controlling wiper 603 as soon as wiper 607 engages a grounded contact. Thus when wiper 607 engages the last contact Mᵐ which has had ground placed upon it by energized relay M', relay 607ª operates, attracting the armature 609 to open normal contact 610 and close contact 609—610. Armature 608 locks relay 607ª to ground through wiper 605. At the time relay 607ª energizes, wiper 603 is between two of the contact projections of the ring 604 so that relay PR² is immediately deënergized a single time, the wipers 603 and 607 being so alined upon the shaft 600 that whenever wiper 607 is engaging a contact associated with it, the wiper 603 will be between two contact projections of ring 604 and so disconnected from said ring. The wiper 605 is so alined upon shaft 600 with respect to wiper 607 that whenever wiper 607 passes off the last contact of one of its associated contact groups, wiper 605 immediately passes upon one of the associated insulations upon the ring 606 so that the deënergization of relay 607ª is produced whenever wiper 607 leaves the last contact of a group. Thus, after the single deënergization of relay PR² described, relay 607ª immediately deënergizes and normal contact 610 is closed whereby the relay PR² is re-operated by current flowing to ground through attracted armature 612. Following this, wiper 601 reëngages the first insulating segment of ring 602 whereby a momentary deënergization of relay SR² is produced. The single deënergization of relay PR² followed by one of SR² is of course effective to adjust the first selector R to select the group of second selectors assigned for connection to the first thousand and then an idle switch out of the group.

As wipers 601, 603, 605, 607, of the operator's device continue their travel, wiper 607, will eventually engage the third contact C$^c$ grounded by the operation of relay C² whereupon relay 607 operates and locks as before. At this time wiper 603 will be on open circuit whereby relay PR² deënergizes immediately, after which wiper 603 engages the last contact C$^{c'}$, re-operating relay PR² and when wiper 603 passes off said last contact, relay PR² again deënergizes. Immediately following this, wiper 605 unlocks relay 607ª and relay PR² is energized by current to ground at armature 612; whereafter wiper 601 engaging the second insulating segment of ring 602 deënergizes momentarily relay SR². These deënergizations of relays PR² and SR² will adjust the second selector L to select the group of connectors assigned to the second hundred of the first thousand, and then an idle connector of the group.

As the wipers of the operator's calling device continue travel, wiper 607 will come to engage the second contact D$^d$ grounded by the operation of relay D³ whereafter relay 607ª will be energized and wiper 603, while passing over the remaining contacts D$^d$, will cause three momentary deënergizations of relay PR², whereafter wiper 605 deënergizes relay 607ª, the reoperation of relay PR² then occurring whereafter wiper 601 momentarily deënergizes the relay SR². These deënergizations of relays PR² and SR² adjust the connector M to select the third group of its associated hundred as previously described.

Wiper 607 continues its travel and engages the second contact U$^u$ ungrounded by the operation of relay U³. Circuit changes at the calling device will occur in a manner obvious from the proceeding, whereby three deënergizations of relay PR² will be produced followed by one of relay SR², the connector M being thereby adjusted to connection by the called line 1233 and the test applied to said line. When now, the shaft, ratchet and wipers of the switch of Fig. 6 are about to reach normal, contact 142 is opened as before, momentarily, whereby the locked relays M', C², D³, U³ are all deënergized. Also contact 141, being momentarily opened, takes ground from wire 522 whereby release magnet R⁴ of switch W is deënergized to withdraw the retaining pawl from the ratchet controlling the wipers 500, 501, 502, 503, the associated spring then automatically restoring switch W to normal at which time the off-normal contacts 512, 513, 518, will be shifted to normal. From now on, the switch W may be selected by the master-switch T and started again by the mechanism of said master-switch to connect the operator's calling device at Fig. 6 with some other first selector R that may become connected with a calling line. It will be understood that when shaft 600 of Fig. 6 reaches normal, contact 146 is automatically opened as in Fig. 1, Part 3, and the switch comes to rest. It will also be seen that on the deënergization of release magnet RM, circuit is opened through relays 85ª and 611, deënergizing said relays of which 85ª retracts its armatures to close circuits for relays PR² and SR² over the calling line without said relays permitting the retraction of their armatures.

When the calling and called subscribers replace their receivers, the connecting mechanism at the exchange will be restored to normal in a manner similar to that described in connection with the first circuit diagram, that shown in Fig. 1.

While I have shown repeatedly the customary battery symbol in the drawings, it will be understood that the symbols indicating batteries of one polarity may be a single source of current. Of course, where trunking between exchanges is used, a suitable battery will be supplied in each exchange. Likewise, the repeated generator symbols shown may be a single source of current.

It will be seen with respect to the operators' impulse transmitters, shown in Fig. 1, Part 3, and Fig. 6, that each spring 1$^b$, 2$^b$, etc., being arranged to be connected with the different contacts M, C, D, U, may be said to have a plurality of connections, one for each decimal position which the digit the spring is assigned to may occupy in the called subscriber's number, and the adjective "decimal" will be used in the claims in this connection as a descriptive term. It will, however, be understood that it is not used as restricted to a system of designations employing the Arabic system of notation, but is employed in a general sense and may refer to any characters placed adjacent to one another to form designations for telephone subscribers, which characters have definite locations with respect to one another.

It will be seen that although I have indicated a preferred arrangement of the general system as one in which the operators are all located in a single exchange building, the outlying exchanges being connected thereto by the impulse trunks, the general arrangement may with equal facility be employed where each exchange of a general system has individual local operators' positions where all incoming calls from its subscribers may be attended to; where there are numerous exchanges, say eight, they may be divided into groups of say, four each, and all incoming calls from four exchanges may go to one operator's switching room.

Also, should it be deemed advisable, it is entirely within the scope of the present invention that the wires connecting the switches E and F should be the long links connecting outlying exchanges with the operators' exchanges rather than the trunk lines connecting the first selectors to the operator's devices. The system of my invention is flexible in other respects, and various changes may be made in the arrangements illustrated without departing from the scope of the invention.

What I claim as my invention is:

1. In a telephone system, an impulse transmitter including a key adapted for successive actuations to set up the same digit a plurality of times, and a switch for transmitting the digits set up.

2. In a telephone system, an impulse transmitter, comprising means for transmitting digits of different decimal positions, a key for each digit to be transmitted, mechanisms for transmitting the digits of the highest decimal values normally connected with said keys respectively, other mechanisms for transmitting the digits of the next decimal values, and circuit changing means effective when the mechanism of a digit of the highest value is operated for automatically connecting said keys to said other mechanisms respectively.

3. An impulse transmitter including impulse keys, connections for said keys, and switch means for shifting said connections to different decimal positions.

4. An impulse transmitter including a spring for each digit to be transmitted, adjustable switch members corresponding in number to said springs, conductors connected to said springs respectively and leading to said switch members, and apparatus effective on actuation of any digit spring to shift all said switch members to a different decimal position.

5. An impulse transmitter including an impulse controlling spring, different decimal connections for said spring, and means for actuating said spring and shifting it to a different decimal connection.

6. An impulse transmitter including a switch for each digit to be transmitted, different decimal connections for said switches, mechanism for actuating a switch and shifting all said switches to different decimal connections, and coöperating means for transmitting impulse sets corresponding to the actuated switches.

7. An impulse transmitter including a switch for each digit to be transmitted, different decimal connections for said switches, mechanism for actuating a switch and shifting all said switches to different decimal connections, coöperating means for transmitting impulse sets corresponding to the actuated switches, and means for restoring said switches to their normal decimal connections.

8. In an electric signaling system, the combination with a signaling circuit, of a plurality of keys for controlling the transmission of signals over said circuit, and means whereby each manipulation of one of said keys, in the operation of transmitting a signal, changes in a predetermined manner the electrical effects produced by the subsequent manipulation of any of said keys during said operation of transmitting the signal.

9. In an electric signaling system, the combination with a signaling circuit, of a plurality of keys for controlling the transmission of signals over said circuit, said keys representing the several digits of the decimal system of notation, and means whereby each manipulation of one of said keys in the operation of transmitting a signal changes successively the digit order of said keys, whereby the same keys may act as units' keys, tens' keys, etc., in transmitting a signal representing a number having two or more digit places.

10. In an electrical signaling system, the combination with a signaling circuit, of a contact mechanism comprising a plurality of keys for controlling the electrical condition of said circuit, said keys having numerical values assigned to them, and means whereby the actuation of one of said keys changes in a predetermined manner the electrical effects produced upon the subsequent operation of any one of said keys.

11. A controlling apparatus for selective switching apparatus comprising a contact mechanism including a plurality of keys, said keys having numerical values assigned to them, and means whereby the action of one of said keys in the control of a portion of a composite selecting operation prepares said keys for the control of another portion of said operation by a second action of said key or by the action of another one of said keys.

12. In an electrical signaling system, the combination with a signaling circuit, of mechanism for transmitting impulses over said circuit, comprising a series of keys, traveling switches in circuit with contacts of said keys, one switch for each key, groups of relays arranged for individual connection to said keys through said switches, bank contacts arranged in series of groups and connected in order to contacts of said relays, and a moving contact for sweeping over said bank contacts to connect them in order to said circuit.

13. In an electrical signaling system, the combination with a signaling circuit, of mechanism for transmitting impulses over said circuit, comprising a series of keys, a series of relays, automatic switches for variously connecting said relays to said keys, fixed contacts whose electrical condition is controlled by said relays, and means including a movable contact for successively engaging said fixed contacts to determine the impulses applied to said circuit.

14. In an electrical signaling system, the combination with a signaling circuit, of an impulse controlling device comprising a series of relays, a series of keys for operating said relays, a series of automatic switches for variously connecting said relays and keys, key-controlled mechanism for operating said switches to vary said connections, and means for applying the impulses to said circuit in accordance with the condition of said relays.

15. In an electrical signaling system, the combination with a signaling circuit, of an impulse controlling device comprising a series of fixed contacts, means for applying impulses to said circuit in accordance with the electrical condition of said contacts, a series of relays for varying the electrical condition of said contacts, a series of keys for operating said relays, and a series of automatic switches for variously connecting said keys and relays.

16. In a telephone system, a calling substation, means including a trunk for extending a calling circuit from said substation, a relay associated with said trunk, means controlled by said relay for connecting trunk conductors together to short-circuit said substation, an impulse transmitter, an operator's telephone, and means controlled by said relay to connect leads from said transmitter and telephone to said trunk conductors.

17. In a telephone system, a calling substation, means including a trunk for extending a calling circuit from said substation, a relay associated with said trunk, means operated in response to the energization of said relay to connect trunk conductors together to short-circuit said substation, an operator's telephone, an impulse transmitter, and means responsive to the deënergization of said relay to connect leads from said transmitter and telephone to said trunk conductors.

18. A telephone system including telephone lines, a plurality of interconnecting trunks, means for connecting a calling line to one of said trunks, operator's equipment, automatic switch mechanism for interconnecting conductors of selected trunks and conductors of said equipment, said mechanisms having test contacts connected in multiple, a relay for controlling the connection of certain of said conductors with selected trunks, means including connections through contacts of said relay for providing a guarding electrical condition on said test contacts to prevent other calling trunks from being connected to the appropriated equipment, and means controlled by said relay for short-circuiting calling lines at the time said conductors and equipment are operatively connected to selected trunks.

19. A telephone exchange system comprising a plurality of subscribers' lines, automatic switches and main trunks for use in interconnecting said lines, a plurality of operators' equipments each having means for controlling certain of said switches, control trunks extending from said equipments to said main trunks and certain switches, trunk selectors individual to said control trunks and operative to connect the same to said main trunks, said trunk selectors having its traveling contacts normally disconnected from said control trunks, and a master switch for starting one only of said trunk selectors for each connection.

20. A telephone exchange system comprising a plurality of subscribers' lines, automatic switches and main trunks for use in interconnecting said lines, a plurality of operators' equipments each having means for controlling certain of said switches, control trunks extending from said equipments to said main trunks and certain switches, trunk selectors individual to said control trunks and operative to connect the same to said main trunks, said trunk selectors having circular rows of bank contacts and rotating wipers traveling over said rows, said wipers being normally disconnected from said control trunks, a master switch for controlling said trunk selectors having wipers and bank contacts, means for moving said master switch into a position of rest upon contacts of an idle trunk selector, and means for causing said trunk selectors to test their bank contacts for calling main trunks.

21. A telephone system comprising telephone lines, main trunks and directively operated switches for use in interconnecting said lines, an impulse transmitter, a main trunk selector for connecting said transmitter to main trunks in response to calls, said selector having wipers and bank contacts, a control relay for varying the connections of said wipers, a test relay arranged to be included in circuit with a test wiper, and off-normal contacts operated by said selector, said control relay being operated over a circuit including said off-normal contacts, contacts of said test relay and contacts of said impulse transmitter.

22. A telephone system comprising telephone lines, main trunks and directively operated switches for use in interconnecting said lines, an impulse transmitter, a main trunk selector for connecting said transmitter to main trunks in response to calls, said selector having wipers and bank contacts, a signal associated with said transmitter, relays associated with said main trunks, means for operating said signal and the relay of a selected main trunk by a circuit through a wiper and a bank contact of said selector, means responsive to the energization of said relay to short-circuit talking conductors of the associated main trunk, and operator's set, and means for deënergizing said relay when said operator's set is connected into circuit.

23. A telephone system comprising telephone lines, main trunks and directively operated switches for use in interconnecting said lines, an operator's control trunk, an operator's impulse transmitter for sending directive impulses over said control trunk, automatic selecting mechanism for interconnecting said control trunk with said main trunks individually, a relay controlled over said control trunk and operative to short-circuit a portion of connected main trunk, means for conductively separating and inductively uniting portions of said main trunk, repeater relays connected to said trunk at one side of said means through contacts of said relay, and connections through contacts of said repeater relays to said trunk at the other side of said means.

24. In an electric signaling system, the combination with a signaling circuit, of a plurality of keys for controlling the transmission of signals over said circuit, and means whereby each manipulation of one of said keys, in the operation of transmitting a portion of a continuous signal, changes in a predetermined manner the portion of said signal which results from the subsequent manipulation of any of said keys in transmitting the next succeeding portion of said signal.

25. In an electric signaling system, the combination with a signaling circuit, of a keyboard provided with a plurality of keys for controlling the transmission of signals over said circuit, said keys having numerical values assigned to them, of means whereby each manipulation of one of said keys in the operation of transmitting a signal changes the numerical values of all of said keys for another manipulation.

26. In an electrical signaling system, the combination with a signaling circuit, of a plurality of keys for controlling the transmission of signals over said circuit, each key representing a different digit or digits of the decimal system of notation, and means effective upon the manipulation of a key whereby the order of the digit which said key represents is changed.

27. In an electric signaling system, the combination with a signaling circuit, of a plurality of keys for controlling the transmission of signals over said circuit, each key representing a different digit or digits of the decimal system of notation, and means whereby each successive manipulation of said key, in the continuous operation of transmitting a signal representing a number of two or more digit places, automatically adapts said keys for transmitting a signal representing the next lower order of digit places.

28. In an electric signaling system, the combination with a keyboard having a plurality of keys, each representing a different digit or digits of the decimal system of notation, of a plurality of sets of impulse controlling devices controlled by said keys, one set being provided for each digit place of the highest number designed to be signaled, means for associating all of said keys with all of said sets and for automatically changing said keys from association with one set to association with the next succeeding set upon each successive manipulation of a key in transmitting a continuous signal, and a signaling circuit associated with said devices.

29. In an electric signaling system, the combination with a keyboard having a plurality of keys corresponding in number and designation to the several digits of the decimal system of notation, of a plurality of sets of impulse controlling devices controlled by said keys, one set being provided for each digit place of the highest number designed to be signaled, means for associating all of said keys with all of said sets said means providing means for automatically changing said keys from association with one set to association with the next succeeding set upon each successive manipulation of a key in transmitting a continuous signal, and a signaling circuit associated with said devices.

30. In a controlling apparatus for electric signaling systems, the combination with a single set of digit keys, of a plurality of sets of impulse controlling devices adapted to be controlled by said keys, and means operated each successive time any one of said keys is depressed for associating said set of keys with successive sets of said devices.

31. In a controlling apparatus for electric signaling systems, the combination with a single set of digit keys, of a plurality of sets of impulse controlling devices with one of which sets said keys are normally associated, and means operated upon the depression of any one of said keys for disassociating said set of keys and said normally associated sets of devices and associating said set of keys with another of said sets of devices.

32. In a controlling apparatus for electric signaling systems, the combination with a set of digit keys comprising a single key representing each digit, of a plurality of sets of impulse controlling devices adapted to be controlled by said keys, and automatic means for associating said set of keys with one after another of said sets of devices, upon the successive operation of any keys of said key set.

33. In a controlling apparatus for electric signaling systems, the combination with a set of digit keys comprising a single key representing each digit, of a plurality of sets of impulse controlling devices with one only of which said keys are normally associated, and automatic means for associating said set of keys with another of said sets of devices, the second sets of devices being thus placed under the control of any one of the keys of said key set.

34. In a controlling apparatus for electric signaling systems, the combination with a single set of digit keys, of a plurality of sets of impulse controlling devices adapted to be controlled by said keys, and means operated in the operation of said keys for successively associating said set of keys with a different one of said sets of devices and for placing said sets of devices successively under temporary control of any key of said key set each time a key is operated in the transmission of a continuous signal.

35. In an electrical signaling system, the combination with a signaling circuit, of a contact mechanism comprising a plurality of keys for controlling the electrical condition of said circuit, said keys representing the several digits of the decimal system of notation, and means effective upon each manipulation of one of said keys to change successively the digit order of said keys, whereby the electrical effects produced upon the subsequent operation of any one of said keys are changed.

36. In an electrical signaling system, the combination with a signaling circuit, of a contact mechanism comprising a plurality of keys for controlling the electrical condition of said circuit, each said key representing a different digit or digits of the decimal system of notation, and means effective upon the manipulation of a key whereby the order of the digit which said key represents is changed.

37. In an electrical signaling system, the combination with a signaling circuit, of a contact mechanism comprising a plurality of keys for controlling the electrical condition of said circuit, each said key representing a different digit or digits of the decimal system of notation, and means whereby each successive manipulation of one of said keys automatically adapts said keys for changing in a predetermined manner the electrical effects produced upon the subsequent operation of one of said keys.

38. A controlling apparatus for selective switching apparatus comprising a contact mechanism including a plurality of keys, said keys having numerical values assigned to them, and means whereby the action of one of said keys in the control of a portion of a composite selecting operation changes the numerical values of all of said keys for the control of another portion of said operation.

39. A controlling apparatus for selective switching apparatus comprising a contact mechanism including a plurality of keys, said keys representing the several digits of the decimal system of notation, and means whereby the manipulation of one of said keys in the control of a composite selecting operation prepares all of said keys for the control of another portion of said operation.

40. A controlling apparatus for selective switching apparatus comprising a contact mechanism including a plurality of keys, said keys representing the several digits of the decimal system of notation, and means whereby each manipulation of one of said keys in the control of a portion of a composite selecting operation changes successively the digit order of said keys so that any one of them may control another portion of said operation.

41. A controlling apparatus for selective switching apparatus comprising a contact mechanism including a plurality of keys, each key representing a different digit or digits of the decimal system of notation, and means whereby the successive manipulations of one of said keys in the control of a portion of a composite selecting operation change the order of the digit which said key represents for each manipulation.

42. A controlling apparatus for selective switching apparatus comprising a contact mechanism including a plurality of keys, each key representing a different digit or digits of the decimal system of notation, and means whereby each successive manipulation of said keys in the control of a portion of a composite selecting operation automatically adapts said keys for representing in the control of another portion of said operation the next lower order of digits places.

In witness whereof, I hereunto subscribed my name this 18th day of June, 1908.

GEORGE E. MUELLER.

Witnesses:
F. SCHOENWOLF,
CAROLYN WEBER.